(12) United States Patent
Taki

(10) Patent No.: US 8,294,806 B2
(45) Date of Patent: Oct. 23, 2012

(54) PHOTOGRAPHIC LENS SYSTEM AND IMAGE PICKUP APPARATUS

(75) Inventor: Yoshiyuki Taki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 12/484,697

(22) Filed: Jun. 15, 2009

(65) Prior Publication Data

US 2009/0251589 A1    Oct. 8, 2009

Related U.S. Application Data

(63) Continuation of application No. 11/177,891, filed on Jul. 8, 2005, now Pat. No. 7,583,441.

(30) Foreign Application Priority Data

Jul. 9, 2004 (JP) ................................. 2004-203859
Dec. 16, 2004 (JP) ................................. 2004-364529

(51) Int. Cl.
  *H04N 5/225* (2006.01)
  *H04N 5/232* (2006.01)
  *G02B 15/14* (2006.01)
  *G02B 15/22* (2006.01)

(52) U.S. Cl. ......... 348/335; 348/345; 359/684; 359/693

(58) Field of Classification Search .................. 348/340, 348/240.3, 335, 345; 359/555, 557, 684, 359/693; 396/79
See application file for complete search history.

(56) References Cited

U.S. PATENT DOCUMENTS

| | | | |
|---|---|---|---|
| 5,029,010 A * | 7/1991 | Shiraishi ..................... 348/347 |
| 5,192,964 A * | 3/1993 | Shinohara et al. ............ 396/55 |
| 5,396,367 A * | 3/1995 | Ono et al. .................... 359/687 |
| 5,748,994 A * | 5/1998 | Kai et al. ...................... 396/55 |
| 5,946,028 A * | 8/1999 | Ishikawa ...................... 348/64 |
| 6,407,771 B1 * | 6/2002 | Kanbara et al. ......... 348/207.99 |
| 7,295,387 B1 * | 11/2007 | Ohmori et al. ............... 359/796 |
| 2002/0075388 A1 * | 6/2002 | Koyama et al. .............. 348/220 |
| 2002/0097324 A1 * | 7/2002 | Onuki .......................... 348/208 |
| 2004/0240052 A1 * | 12/2004 | Minefuji et al. ............. 359/435 |
| 2006/0007342 A1 * | 1/2006 | Taki .............................. 348/335 |
| 2007/0008418 A1 * | 1/2007 | Kuroda et al. ............ 348/240.3 |
| 2009/0251589 A1 * | 10/2009 | Taki ............................. 348/340 |

* cited by examiner

*Primary Examiner* — Nhan T Tran
*Assistant Examiner* — Amy Hsu
(74) *Attorney, Agent, or Firm* — Canon USA, Inc., IP Division

(57) ABSTRACT

A photographic lens system including multiple lens units where at least a part of one of the multiple lens units is movable in a direction, which includes a vector component orthogonal to an optical axis, and where the photographic lens system can have a normal and image stabilizing mode.

5 Claims, 26 Drawing Sheets

FIG. 13
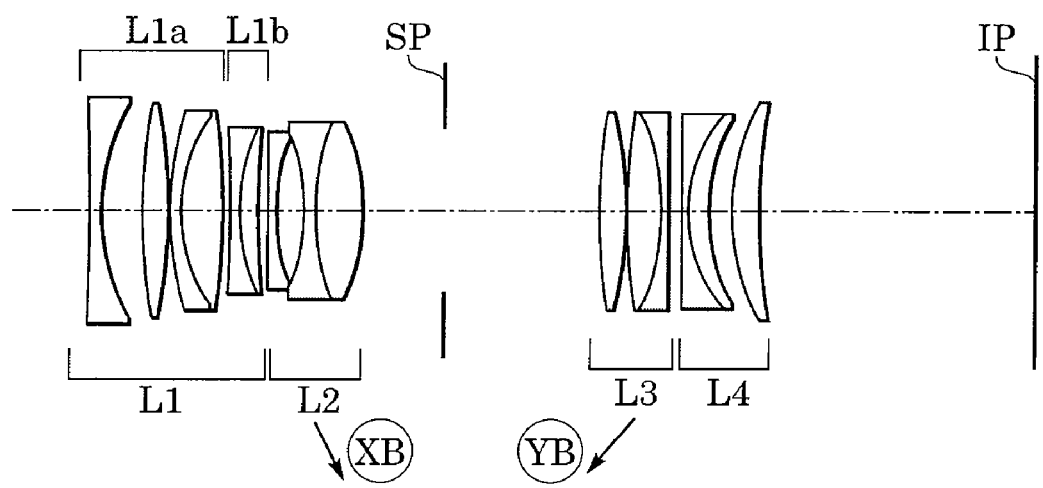
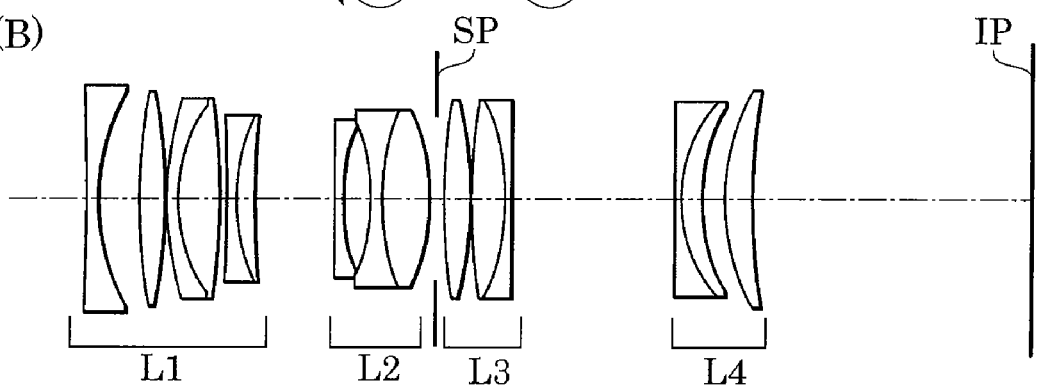

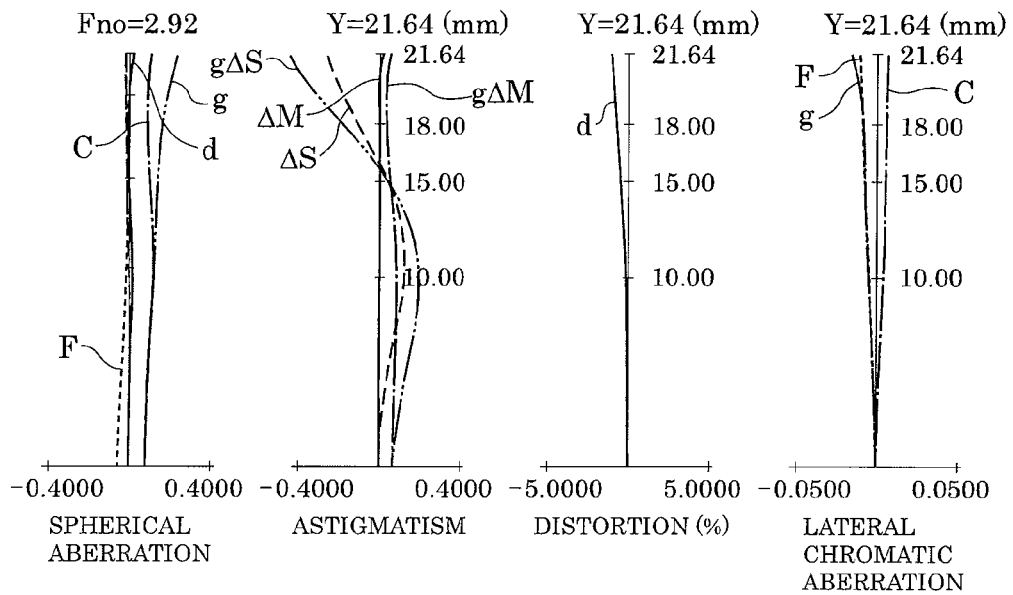
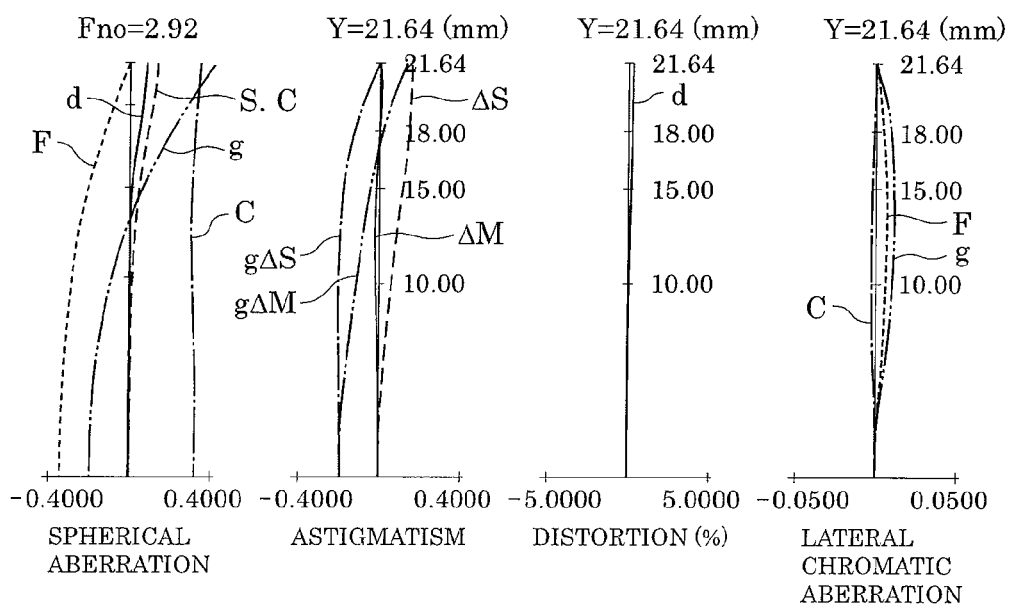

FIG. 16
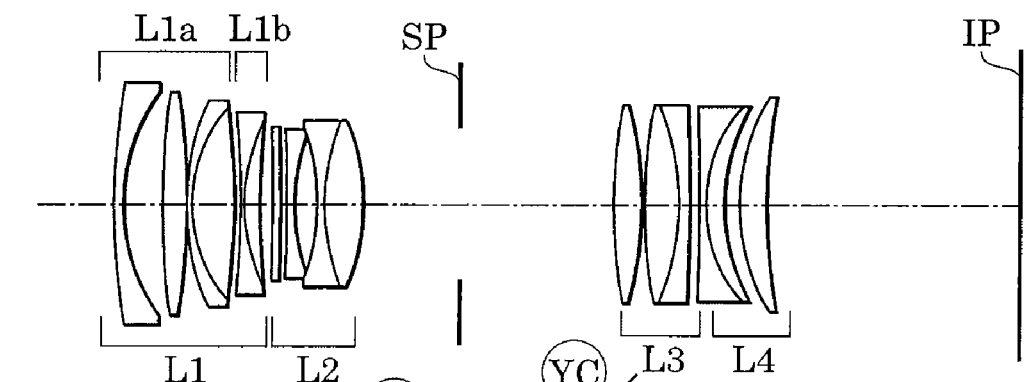
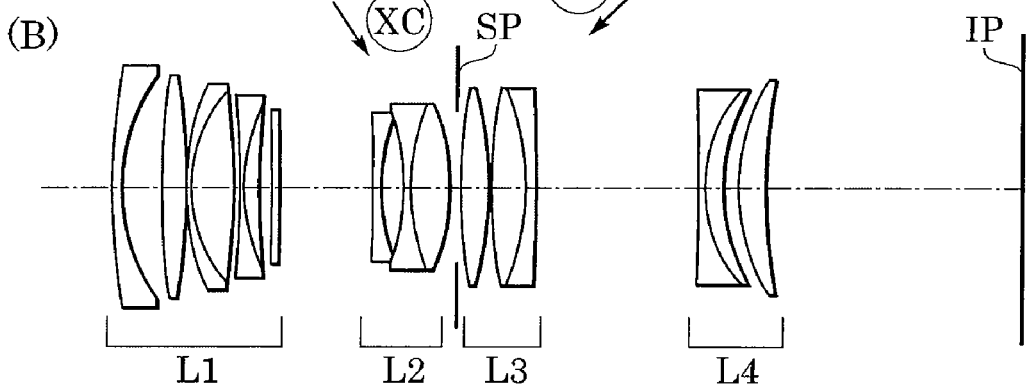

FIG. 19
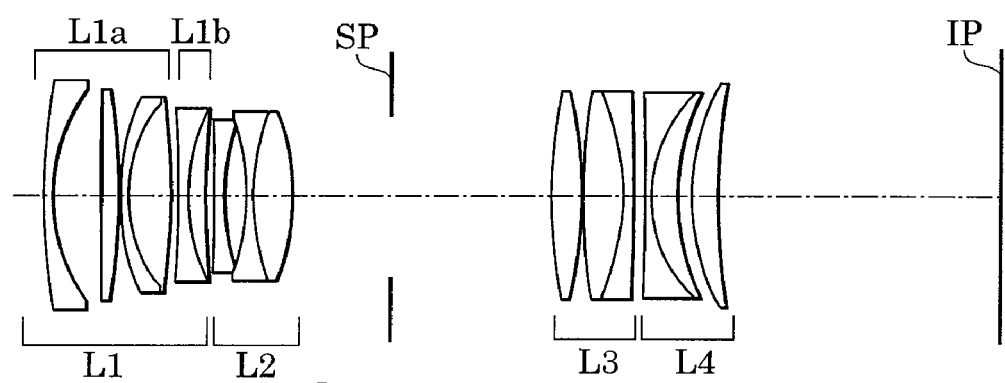
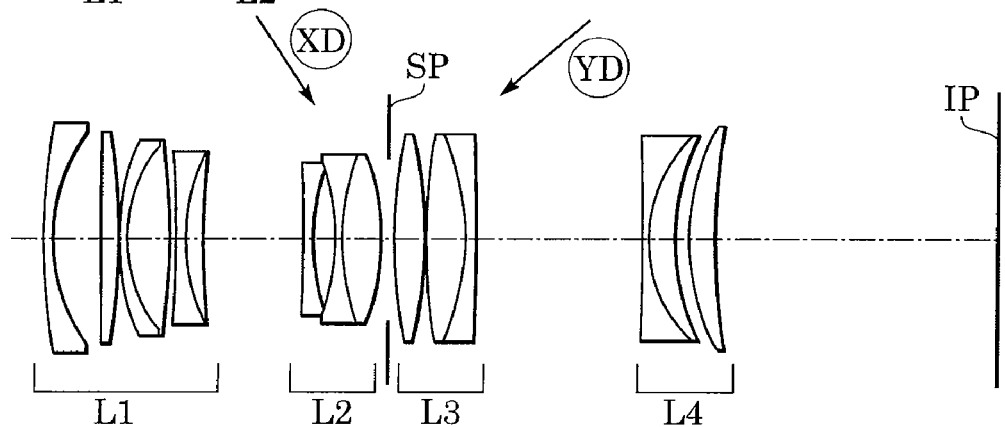

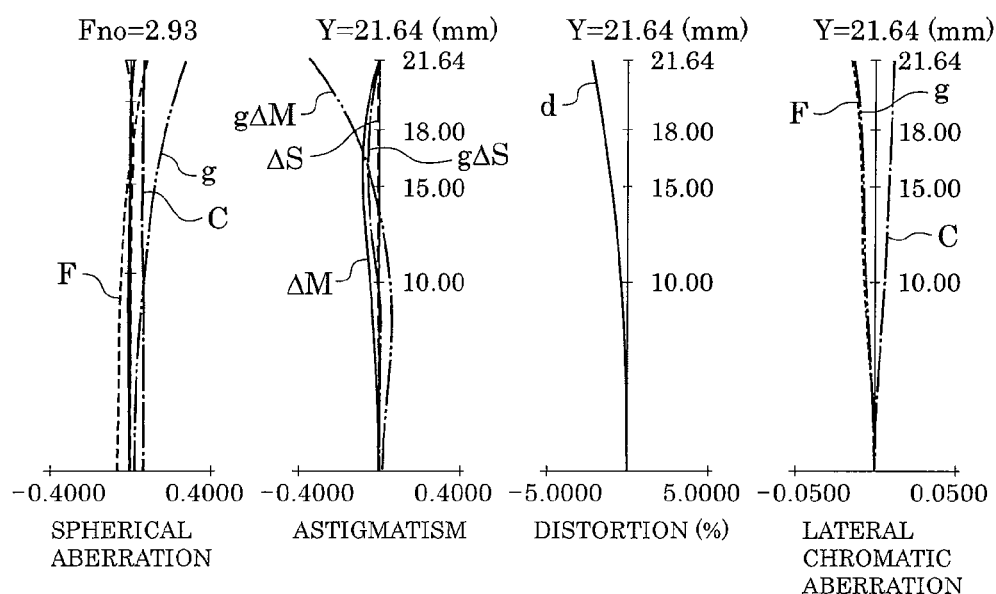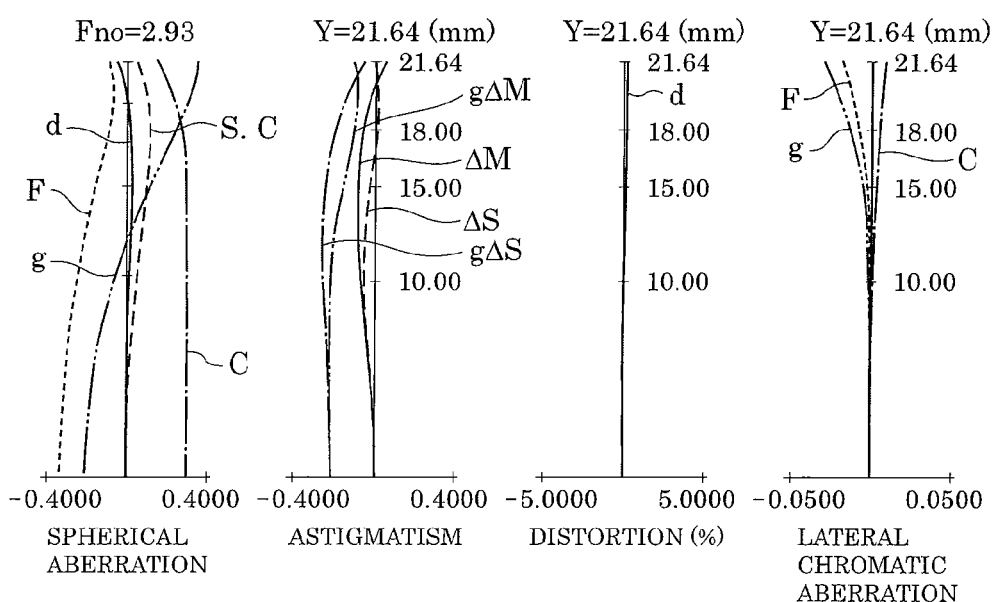

FIG. 22
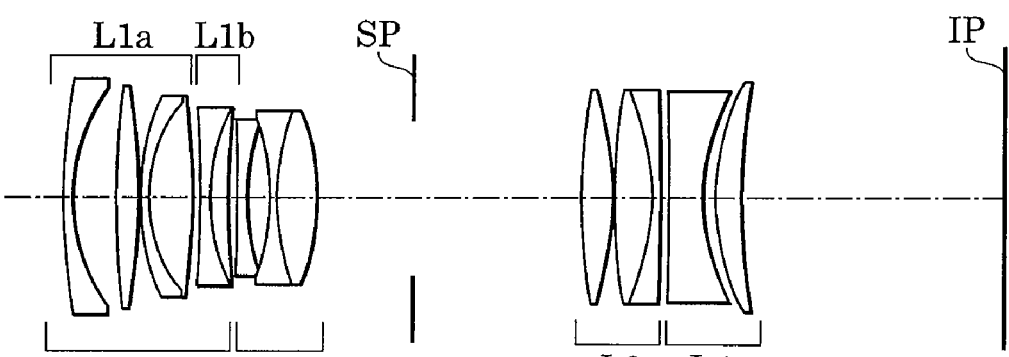
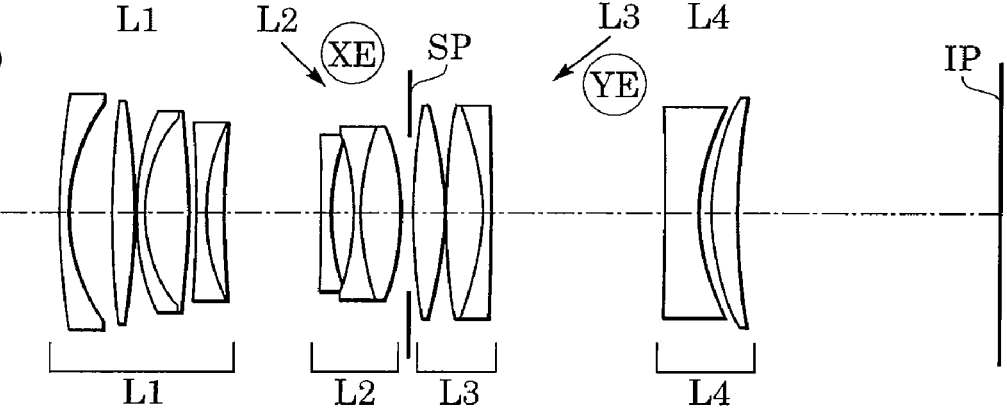

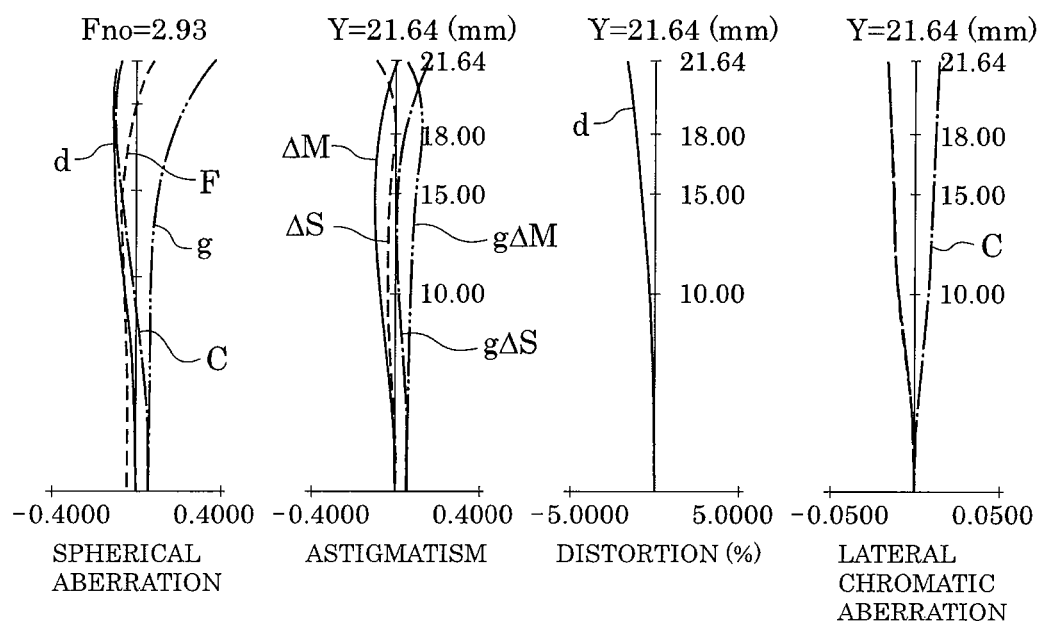
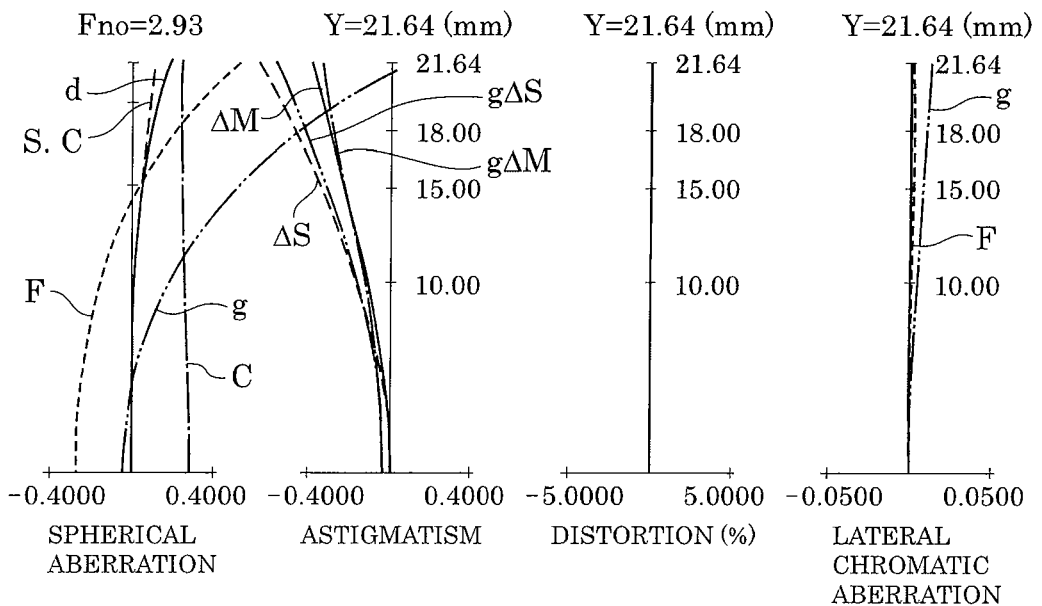

PHOTOGRAPHIC LENS SYSTEM AND IMAGE PICKUP APPARATUS

CROSS REFERENCE TO RELATED APPLICATIONS

The present application is a Continuation of U.S. patent application Ser. No. 11/177,891, filed Jul. 8, 2005, entitled "PHOTOGRAPHIC LENS SYSTEM AND IMAGE PICKUP APPARATUS", the content of which is expressly incorporated by reference herein in its entirety. Further, this application claims priority from Japanese Patent Application No. 2004-203859 filed Jul. 9, 2004 and Japanese Patent Application No. 2004-364529 filed Dec. 16, 2004, both of which are hereby incorporated by reference herein in their entirety.

BACKGROUND OF THE INVENTION

1. Field of the Invention

The present invention generally relates to a photographic lens system and more specifically, but not exclusively, to an interchangeable lens system for a single lens reflex camera.

2. Description of the Related Art

A conventional image pickup apparatus, such as a photographic camera or a video camera, includes a macro-lens system or a micro-lens system (hereinafter collectively referred to as a "macro-lens system") as a photographic lens system to be mainly used in photographing an object at a close distance.

The macro-lens system is designed to achieve increased optical performance in focusing on a close-distance object in comparison to other photographic lens systems such as general standard lens systems and telephoto lens systems.

The macro-lens system, can also be designed to be used for focusing on objects in a wide range extending from close to infinite distances.

In general, as the photographic magnification increases, when changing from an infinity focus to a close-up focus, various aberrations become greater, reducing the optical performance. Therefore, to improve these various aberrations, a photographic lens system using a movement referred to as "floating", in which a plurality of lens units are moved independently of each other when focusing, has been discussed (refer to Japanese Patent Laid-Open No. 2-19814 (corresponding to U.S. Pat. No. 4,986,643) and Japanese Patent Laid-Open No. 2-285313 (corresponding to U.S. Pat. No. 5,007,720)).

Japanese Patent Laid-Open Nos. 2-19814 and 2-285313 discuss a lens system capable of close-up photography including a first lens unit having a positive refractive power, a second lens unit having a positive refractive power, and a third lens unit having a negative refractive power. This lens system, when changing the magnification from reduced power to increased power, carries out floating by fixing the third lens unit relative to the image surface and moving the first and second lens units towards the object side while changing the distance between the first and second lens units.

For example, an optical system, including a structure for compensation of blurring in a photographed image caused by vibration of the optical system (i.e., an image stabilizing function), has been discussed wherein the blurring is compensated for by moving a part of a lens unit constituting the optical system in a direction orthogonal to an optical axis (refer to Japanese Patent Laid-Open Nos. 2-35406, 8-136862, and 1-284823 (corresponding to U.S. Pat. Nos. 5,270,857, 6,124,972, and 5,040,881, respectively) and Japanese Patent Laid-Open No. 2001-272601).

In general, in order to make a macro-lens system that is capable of photographing in a wide range of distances, the extending distance (displacement) of the focusing lens unit should be large when focusing. If the displacement of the focusing lens unit is large, an actuator having a large driving torque will be used when using the macro-lens system in a camera having an automatic focusing function. Thus, high-speed automatic focusing tends to be difficult.

For a macro-lens system, fluctuation of the various aberrations, that occur when changing the magnification during photographing, can be great. Therefore, one should try and reduce this fluctuation.

By using a floating mechanism that moves a plurality of lens units during focusing, the fluctuation of the various aberrations due to focusing and the displacement of the lens units during focusing are both reduced.

Accordingly, employing a floating system for a macro-lens system not only reduces the fluctuation of the various aberrations that occur when changing the photographic magnification but also provides an efficient focusing mechanism for a camera having an automatic focus function.

However, including a vibration compensation mechanism into a lens system can be complicated, as described below. The vibration compensation function discussed in Japanese Patent Laid-Open No. 2-35406 is added to a zoom lens system suitable for a lens shutter camera. When this zoom lens system is used as an interchangeable lens system for a single lens reflex camera, the back-focus can be unsatisfactory.

An optical system discussed in Japanese Patent Laid-Open No. 1-284823 is capable of compensating for blurring of an image caused by vibration by using part of a first lens unit. However, since the diameter of the lens unit used for image stabilizing can be large compared to the diameters of other lens units, it can be difficult, for those particular embodiments, to mount the image stabilizing function to the optical system.

The recent digitization of single lens reflex cameras has lead to a reduction in the image size. Hence, an interchangeable lens system having a wide angle of view is useful. If the focal length of the lens system discussed in Japanese Patent Laid-Open No. 2001-272601 is reduced, the diameter of the lenses behind the aperture stop may have to be increased to obtain a sufficient amount of ambient light. Therefore, it could become difficult to add an image stabilizing function to the lens system.

SUMMARY OF THE INVENTION

A photographic lens system according to exemplary embodiments can focus on an object and reduce the effect of fluctuations of various aberrations due to focusing in both a normal mode and an image stabilizing mode.

A photographic lens system according to an exemplary embodiment includes a first lens unit, which does not move for focusing, a second lens unit movable during focusing, an aperture stop, and at least one additional lens unit movable during focusing. The first lens unit, the second lens unit, the aperture stop, and the additional lens unit are disposed in order from the object side to the image side. Although the first lens unit may not move for focusing, a part of it can move, in a direction which includes a vector component orthogonal to the optical axis, so as to displace an image formed by the photographic lens system. Moreover, $$0.8 < d_{sp}/f$$

is satisfied, where $d_{sp}$ represent the distance from a surface closest to the object side of the photographic lens system to the aperture stop and f represents the focal length of the photographic lens system.

A photographic lens system according to another exemplary embodiment includes a first lens unit, which does not move for focusing, a plurality of lens units movable during focusing disposed on the image side of the first lens unit, an aperture stop disposed within the plurality of lens units. At least part of the first lens unit moves, when not focusing, in a direction which includes a vector component orthogonal to the optical axis so as to displace an image formed by the photographic lens system. Moreover, the above-mentioned formula is satisfied for this particular exemplary embodiment.

A photographic lens system according to another exemplary embodiment includes a first lens unit disposed closest to an object and a plurality of lens units movable during focusing, the plurality of lens units disposed on the image side of the first lens unit. The first lens unit moves in a direction including a vector component orthogonal to the optical axis and includes lens component having a negative refractive power for displacing an image formed by the photographic lens system.

Further features of the present invention will become apparent from the following description of exemplary embodiments (with reference to the attached drawings).

BRIEF DESCRIPTION OF THE DRAWINGS

FIGS. 13A and 13B illustrate cross-sectional views of a photographic lens system according to at least one further exemplary embodiment.

FIGS. 14A and 14B illustrate aberrations, astigmatism, and distortion of a photographic lens system according to the exemplary embodiment shown in FIGS. 13A and 13B.

FIGS. 16A and 16B illustrate cross-sectional views of a photographic lens system according to at least one further exemplary embodiment.

FIGS. 19A and 19B illustrate cross-sectional views of a photographic lens system according to at least one further exemplary embodiment.

FIGS. 20A and 20B illustrate aberrations, astigmatism, and distortion of a photographic lens system according to the exemplary embodiment shown in FIGS. 19A and 19B.

FIGS. 22A and 22B illustrate cross-sectional views of a photographic lens system according to at least one further exemplary embodiment.

FIGS. 26A and 26B illustrate aberrations, astigmatism, and distortion of a photographic lens system according to the exemplary embodiment shown in FIGS. 25A and 25B.

DESCRIPTION OF THE EMBODIMENTS

Figure 1:
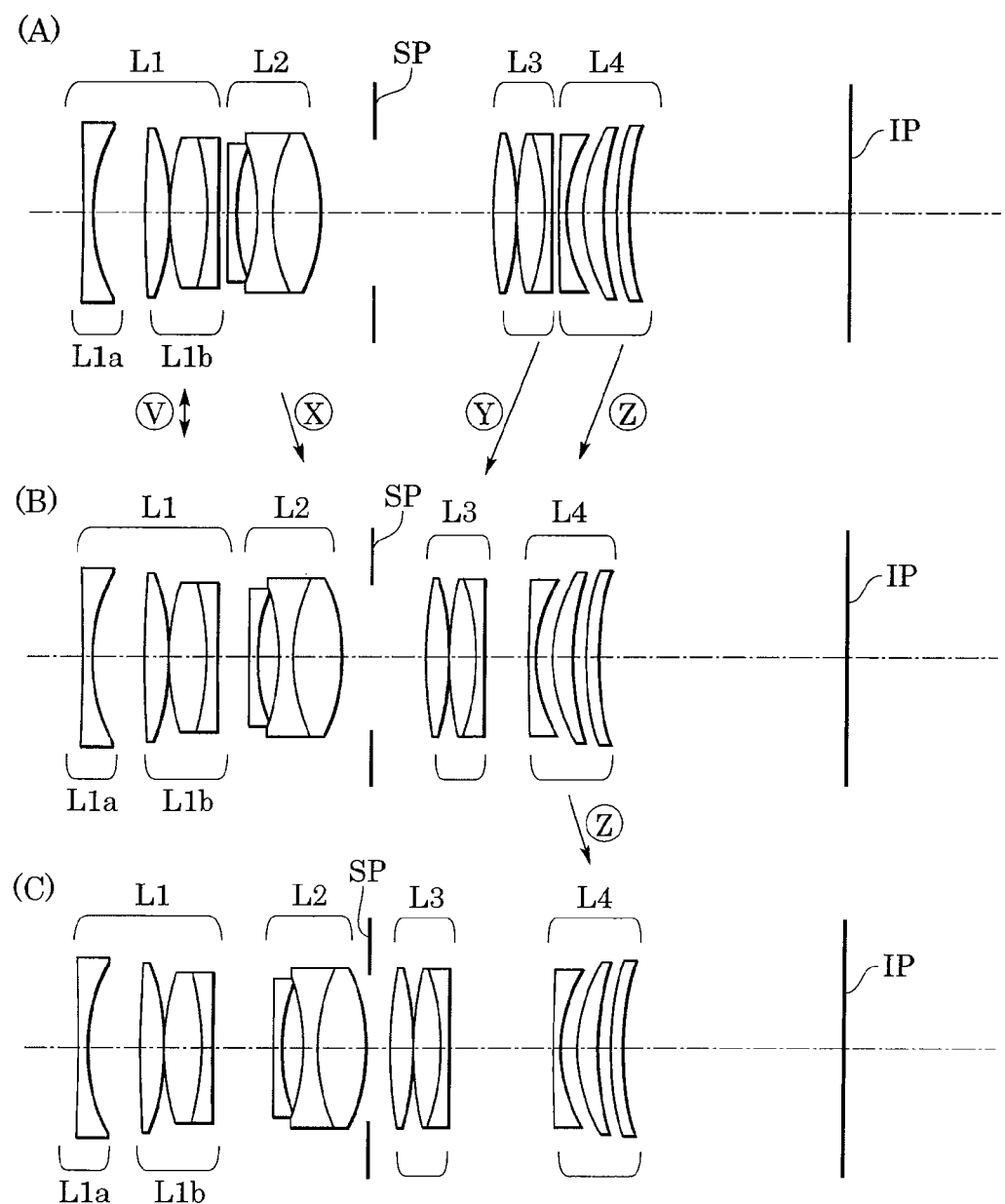
FIGS. 1A to 1C illustrate cross-sectional views of a photographic lens system according to at least one exemplary embodiment.

The following description of exemplary embodiment(s) is merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example lens and lens units are discussed and any material that can be used to form lenses should fall within the scope of exemplary embodiments (e.g., glass, Si). Additionally the actual size of the lens may not be discussed however any size from macro lenses to nano lenses are intended to lie within the scope of exemplary embodiments (e.g., lenses with diameters of nanometer size, micro size, centimeter size, and meter sizes). Additionally exemplary embodiments are not limited to visual optical photographic systems, for example the system can be designed for use with infrared and other wavelength imaging systems. Additionally, exemplary embodiments can be used with non-digital systems as well as digital systems (e.g., photographic systems using CCDs).

Notice that similar reference numerals and letters refer to similar items in the following figures, and thus once an item is defined in one figure, it may not be discussed for following figures.

A photographic lens system in accordance with at least a few exemplary embodiments will be described with reference to the drawings.

First a photographic lens system in accordance with a first exemplary embodiment will be described. The photographic lens system in accordance with the first exemplary embodiment has an image stabilizing lens unit, which is configured to dispose an aperture stop at various positions.

FIGS. 1A to 1C illustrate cross-sectional views of the photographic lens system in accordance with the first exemplary embodiment. FIG. 1A illustrates the photographic lens system being focused on an infinite or distant object. FIG. 1B illustrates the photographic lens system being focused on an object at a close-up object with a magnification of β=−0.5.

FIG. 1C illustrates the photographic lens system being focused on a close-up object with a life-size magnification (β=−1).

Figure 2:
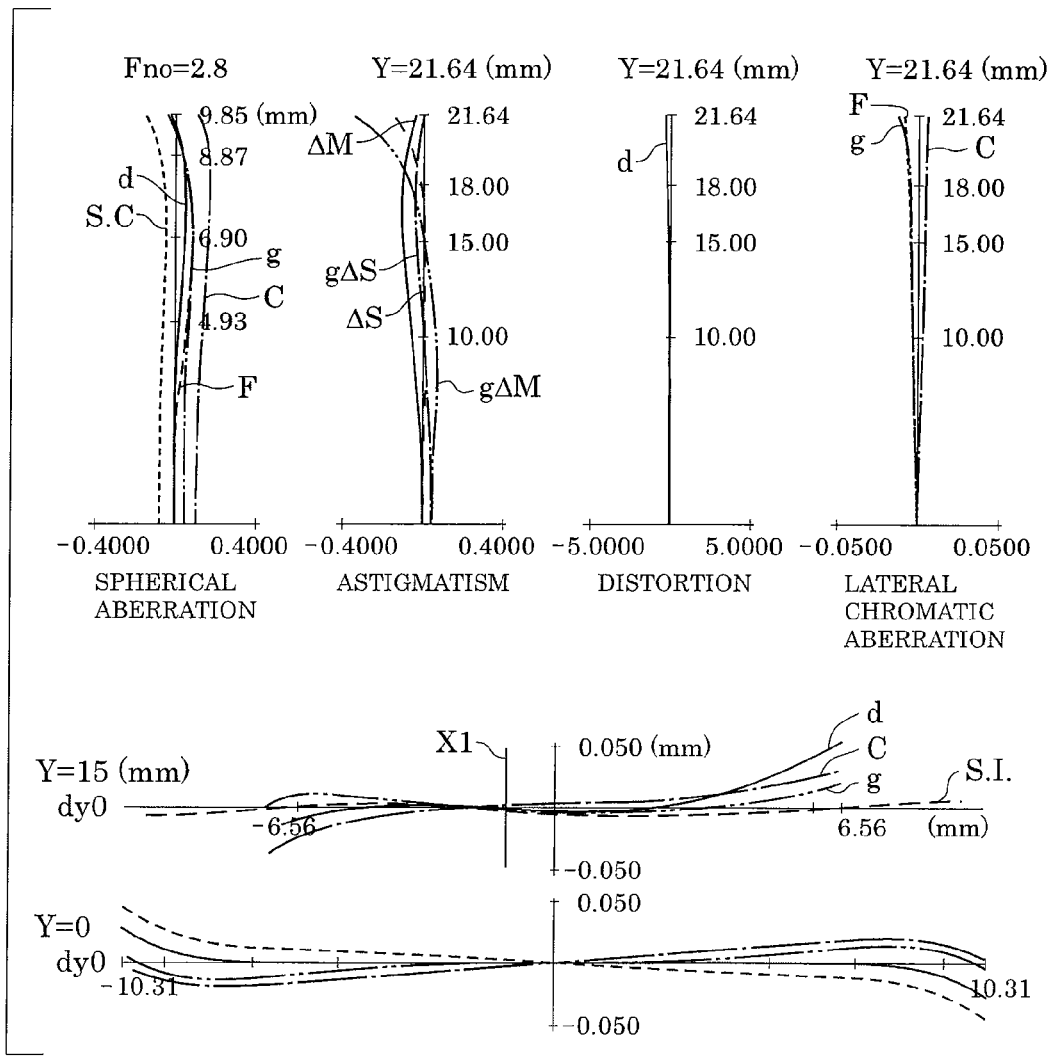
FIG. 2 illustrates aberrations, astigmatism, and distortion of a photographic lens system according to the exemplary embodiment shown in FIGS. 1A to 1C (for an infinite or distant object).
Figure 3:
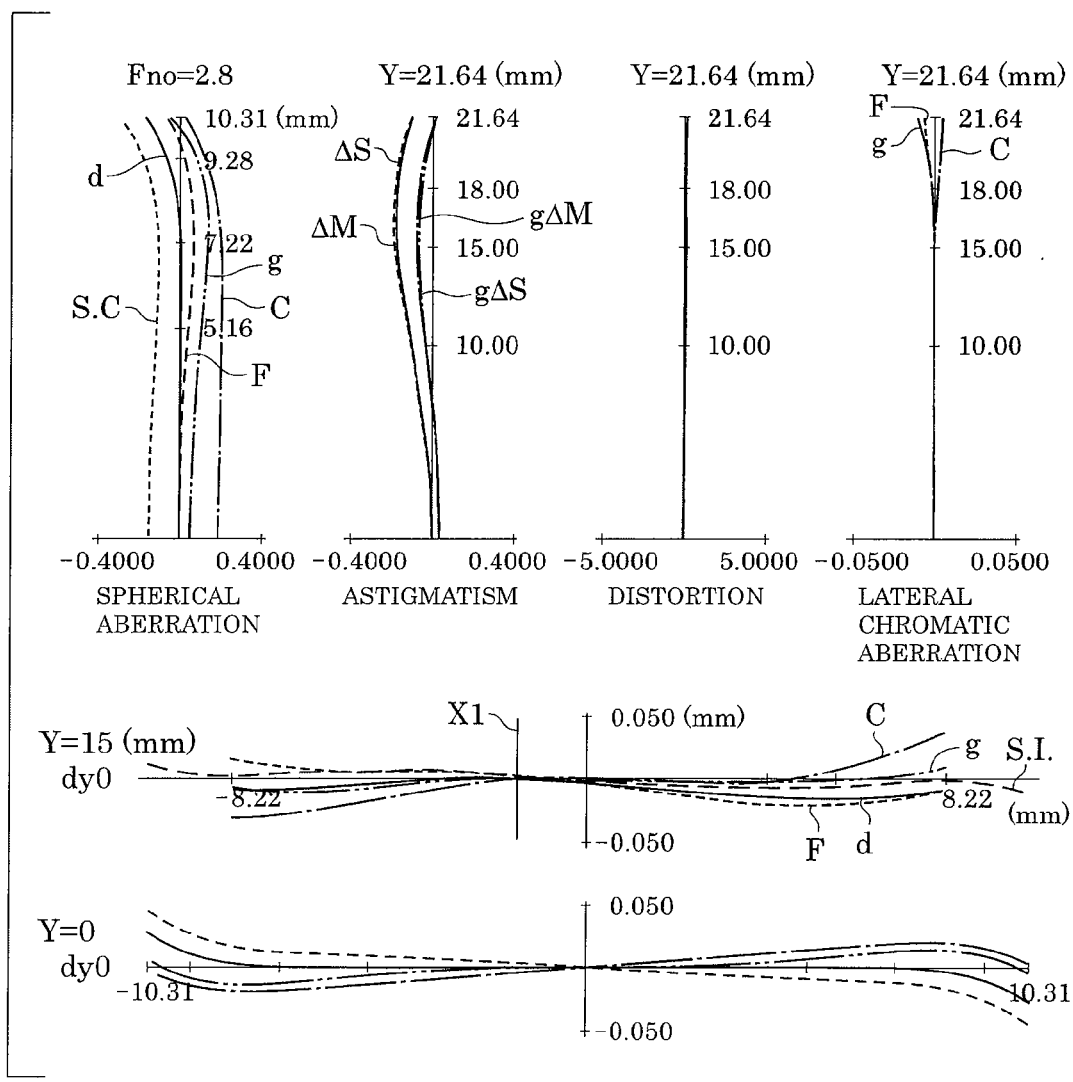
FIG. 3 illustrates aberrations, astigmatism, and distortion of a photographic lens system according to the exemplary shown in FIGS. 1A to 1C in a normal mode ($\beta=-0.5$, where $\beta$ is the image magnification).
Figure 4:
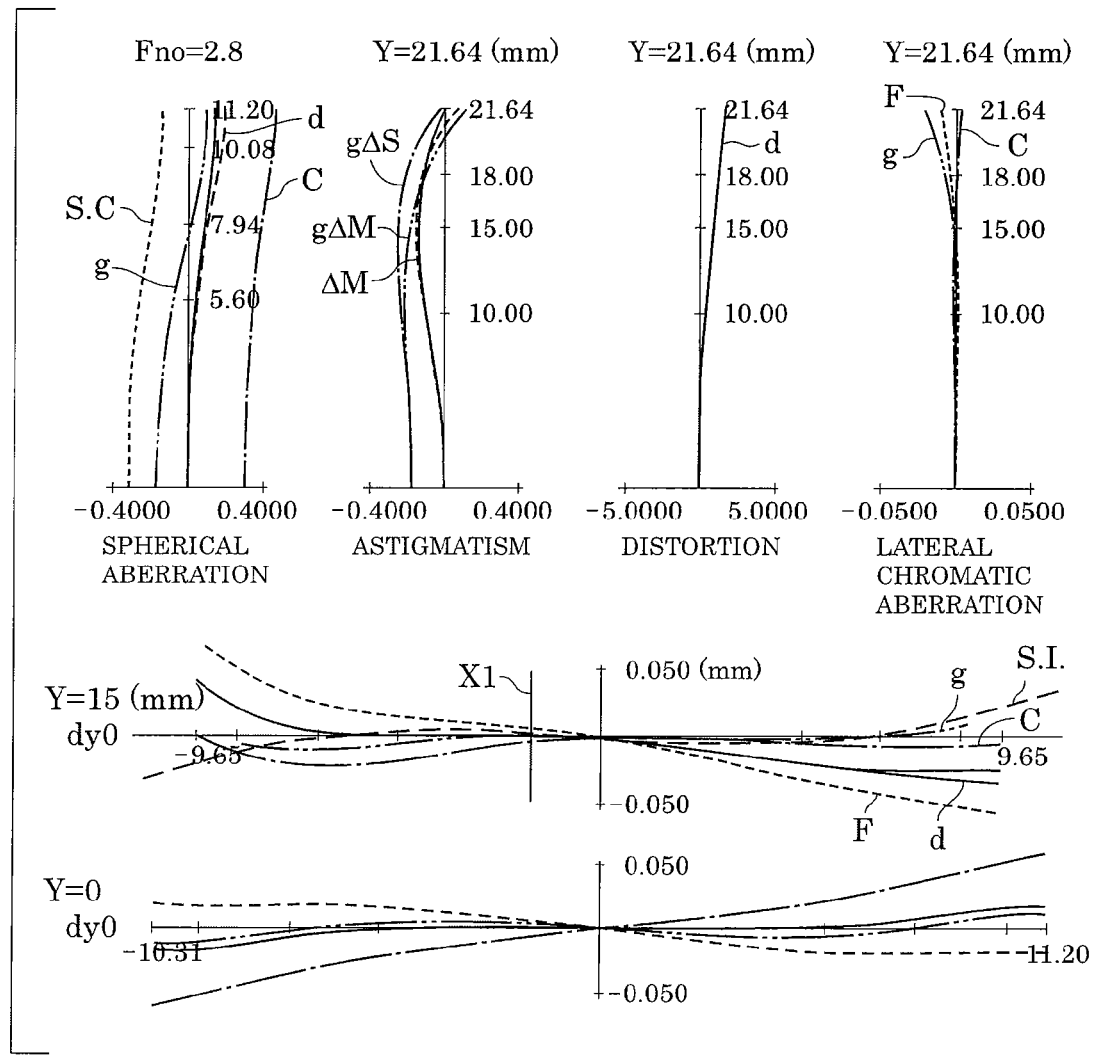
FIG. 4 illustrates aberration, astigmatism, and distortion of a photographic lens system according to the exemplary embodiment shown in FIGS. 1A to 1C in a normal mode ($\beta=-1$).

FIGS. 2 to 4 illustrate aberrations, astigmatism, and distortion of the photographic lens system in accordance with the first exemplary embodiment, where Y is the image height. FIG. 2 illustrates the aberrations, astigmatism, and distortion of the photographic lens system being focused on an infinite or large distant object.

The Figures illustrating various aberrations, astigmatisms, and distortions also illustrate sagittal image planes ΔS, meridional image planes ΔM, focal lengths f, F numbers Fno, and image heights Y. The drawings also show d-lines d (solid line), g-lines g (chain double-dashed line), C-lines C (dashed line), and F-lines F (dotted line). Sine conditions S.C. are also shown. Additionally "gΔM" is the meridional image plane by the g-line, "gΔS" is the sagittal image plane by the g-line, and "X1" is the position of the central ray. S.I. is the sagittal image plane by the d-line.

FIG. 3 illustrates the aberrations, astigmatism, and distortion of the photographic lens system being focused on a close-up object with a magnification of β=−0.5. FIG. 4 illustrates the aberrations, astigmatism, and distortion of the photographic lens system being focused on a close-up object with a life-size magnification (β=−1).

Figure 5:
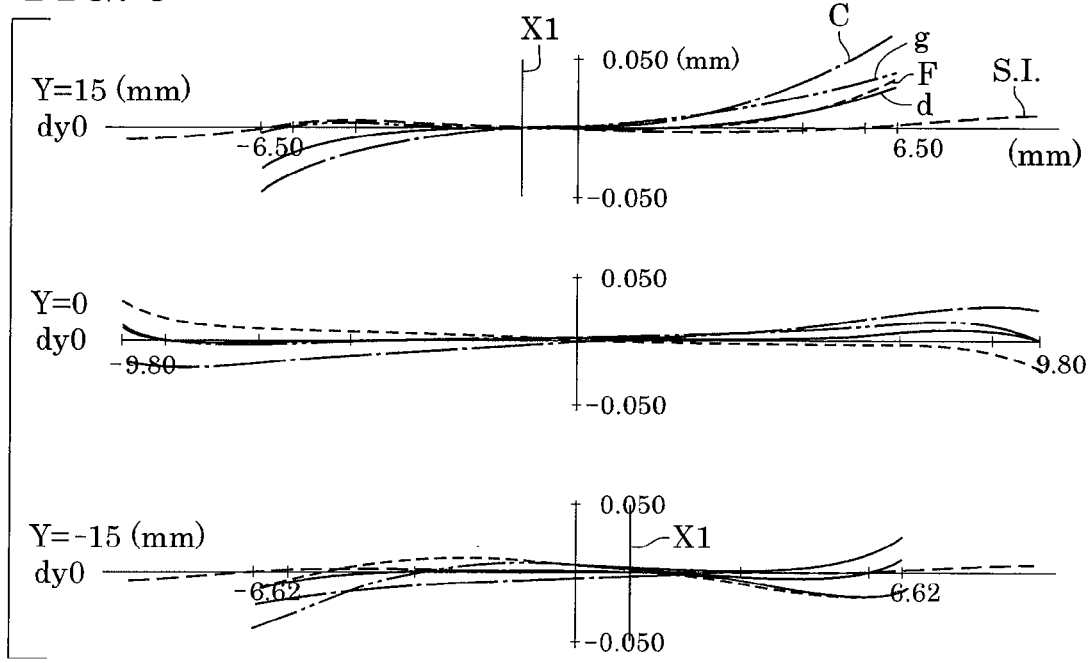
FIG. 5 illustrates aberrations, astigmatism, and distortion of a photographic lens system according to the exemplary embodiment shown in FIGS. 1A to 1C in an image stabilizing mode (for an infinite or distant object).
Figure 6:
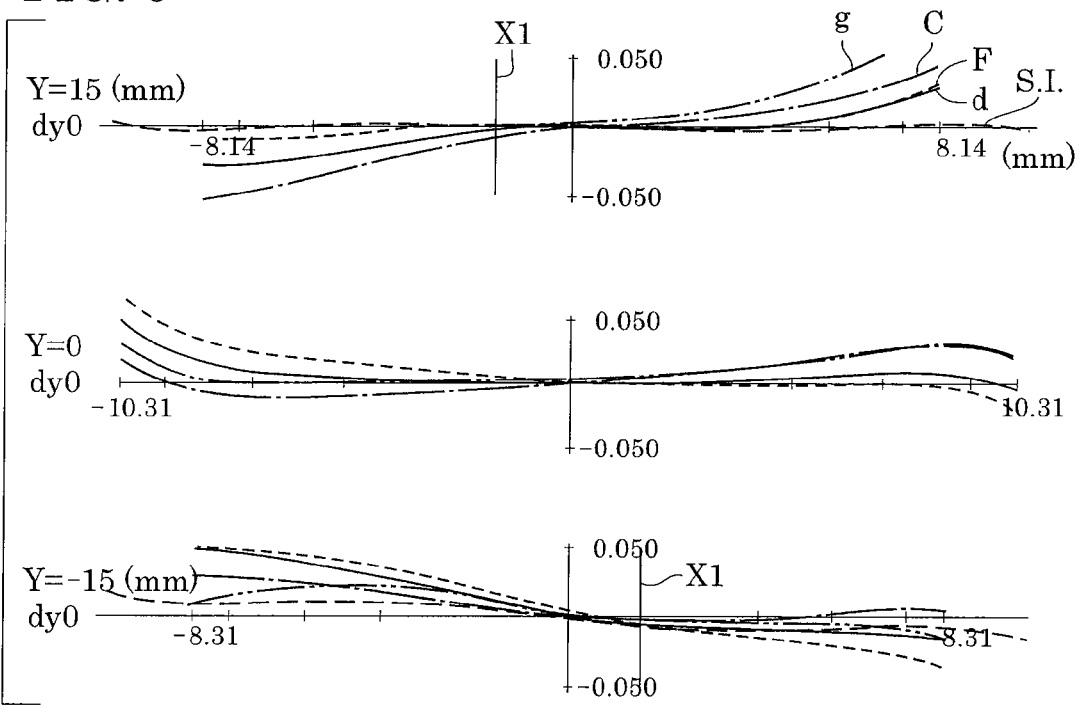
FIG. 6 illustrates aberrations, astigmatism, and distortion of a photographic lens system according to the exemplary embodiment shown in FIGS. 1A to 1C in an image stabilizing mode ($\beta=-0.5$).

FIGS. 5 and 6 illustrate aberrations, astigmatism, and distortion of the photographic lens system in accordance with the first exemplary embodiment in an image stabilizing mode wherein an image shift corresponding to a 3° tilt of the optical axis is compensated for. FIG. 5 illustrates the photographic lens system being focused on an infinite or distant object. FIG. 6 illustrates the photographic lens system being focused on a close-up object with a magnification of β=0.5.

Figure 7:
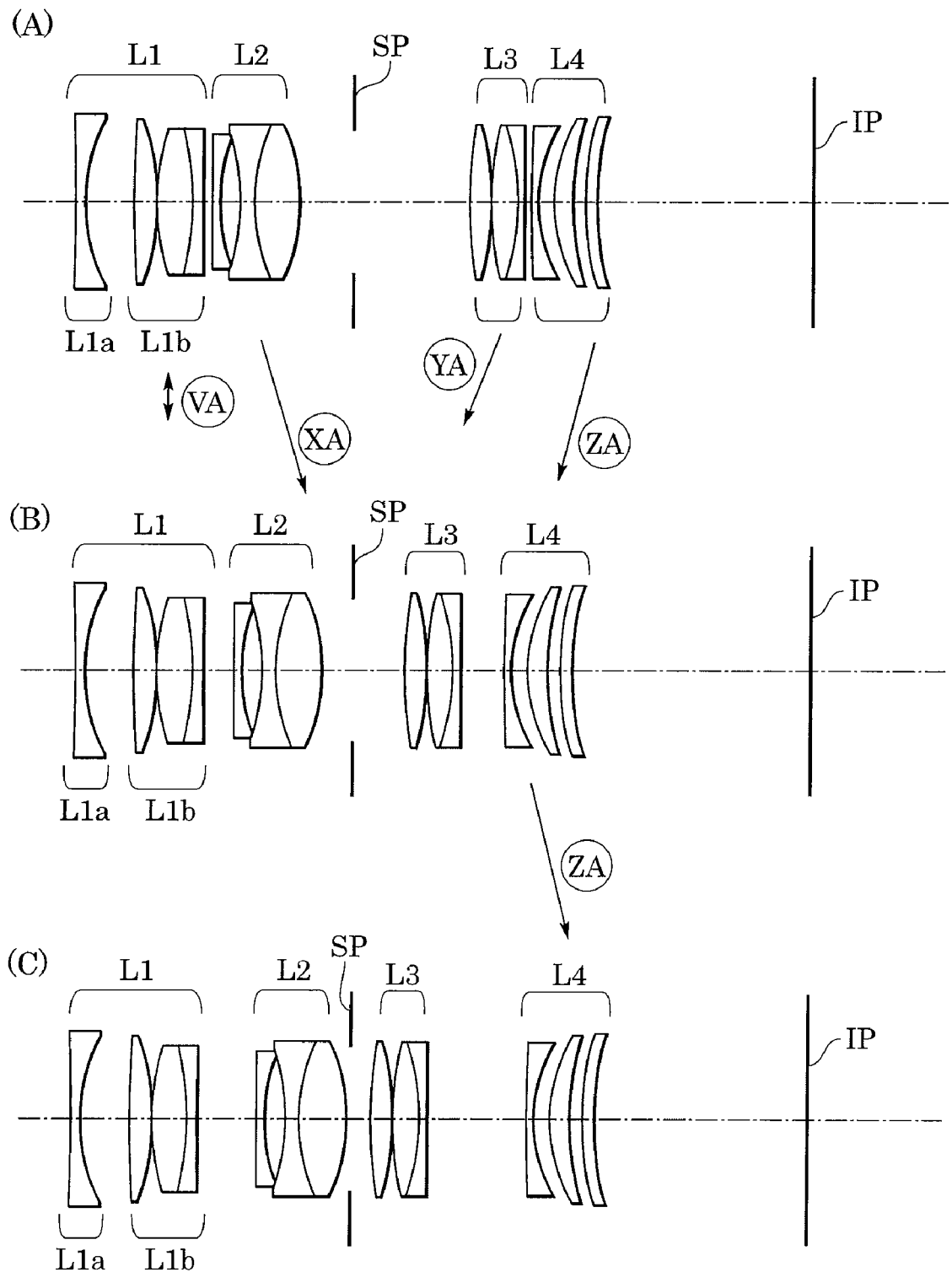
FIGS. 7A to 7C illustrate cross-sectional views of a photographic lens system according to at least one further exemplary embodiment.

FIGS. 7A to 7C illustrate cross-sectional views of a photographic lens system in accordance with a second exemplary embodiment. FIG. 7A illustrates the photographic lens system being focused on an infinite or distant object. FIG. 7B illustrates the photographic lens system being focused on a close-up object with a magnification of β=0.5. FIG. 7C illustrates the photographic lens system being focused on a close-up object with a life-size magnification (β=1).

Figure 8:
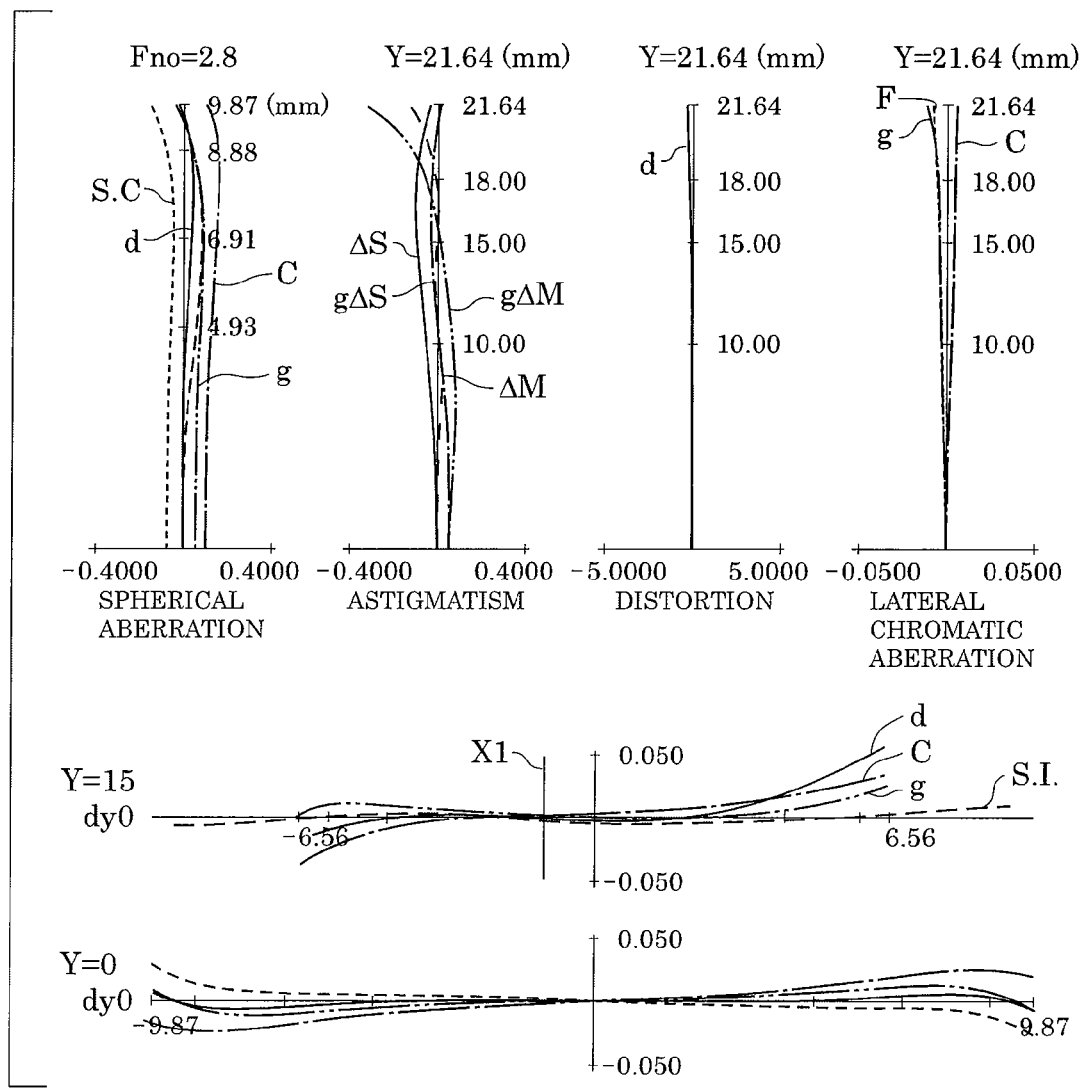
FIG. 8 illustrates aberrations, astigmatism, and distortion of a photographic lens system according to the exemplary embodiment shown in FIGS. 7A to 7C (for an infinite or distant object).
Figure 9:
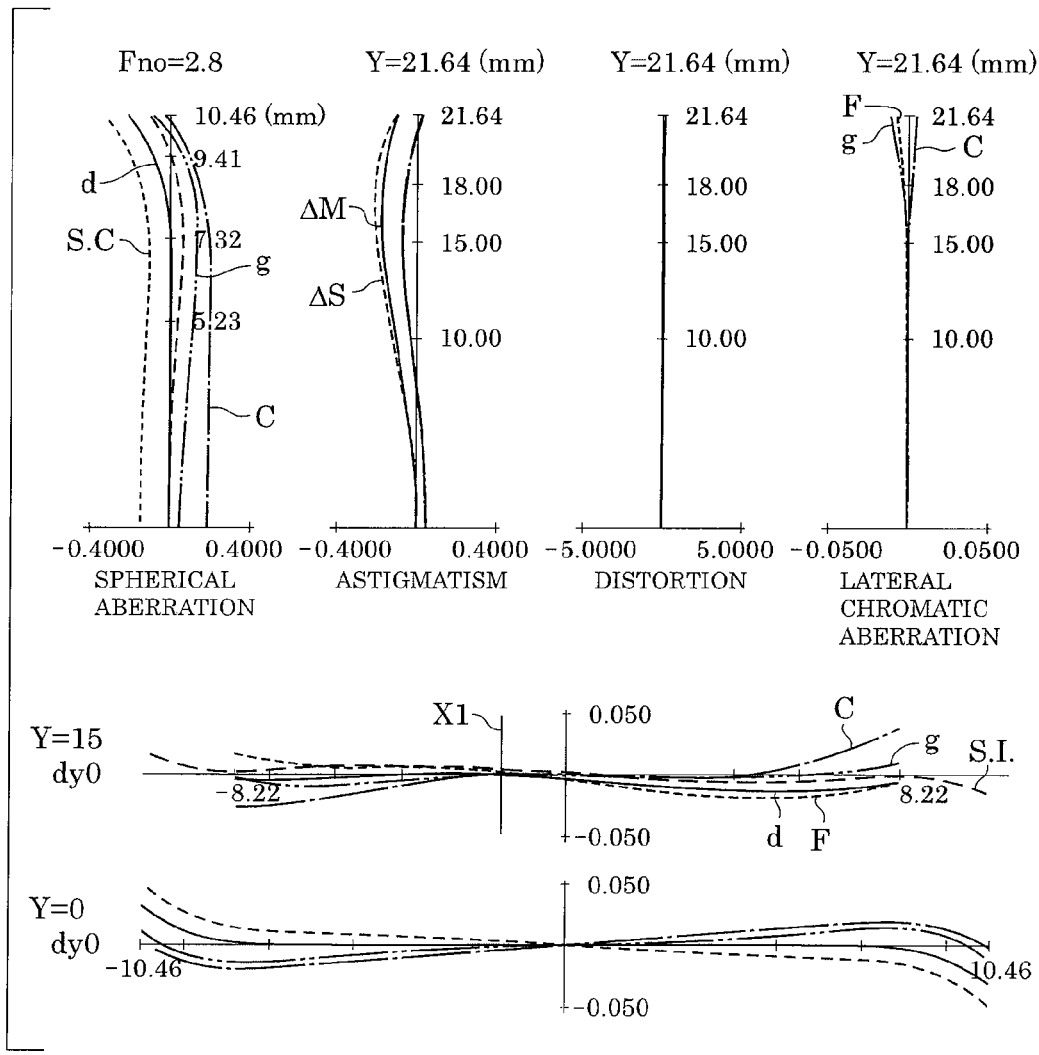
FIG. 9 illustrates aberrations, astigmatism, and distortion of a photographic lens system according to the exemplary shown in FIGS. 7A to 7C in a normal mode ($\beta=-0.5$).
Figure 10:
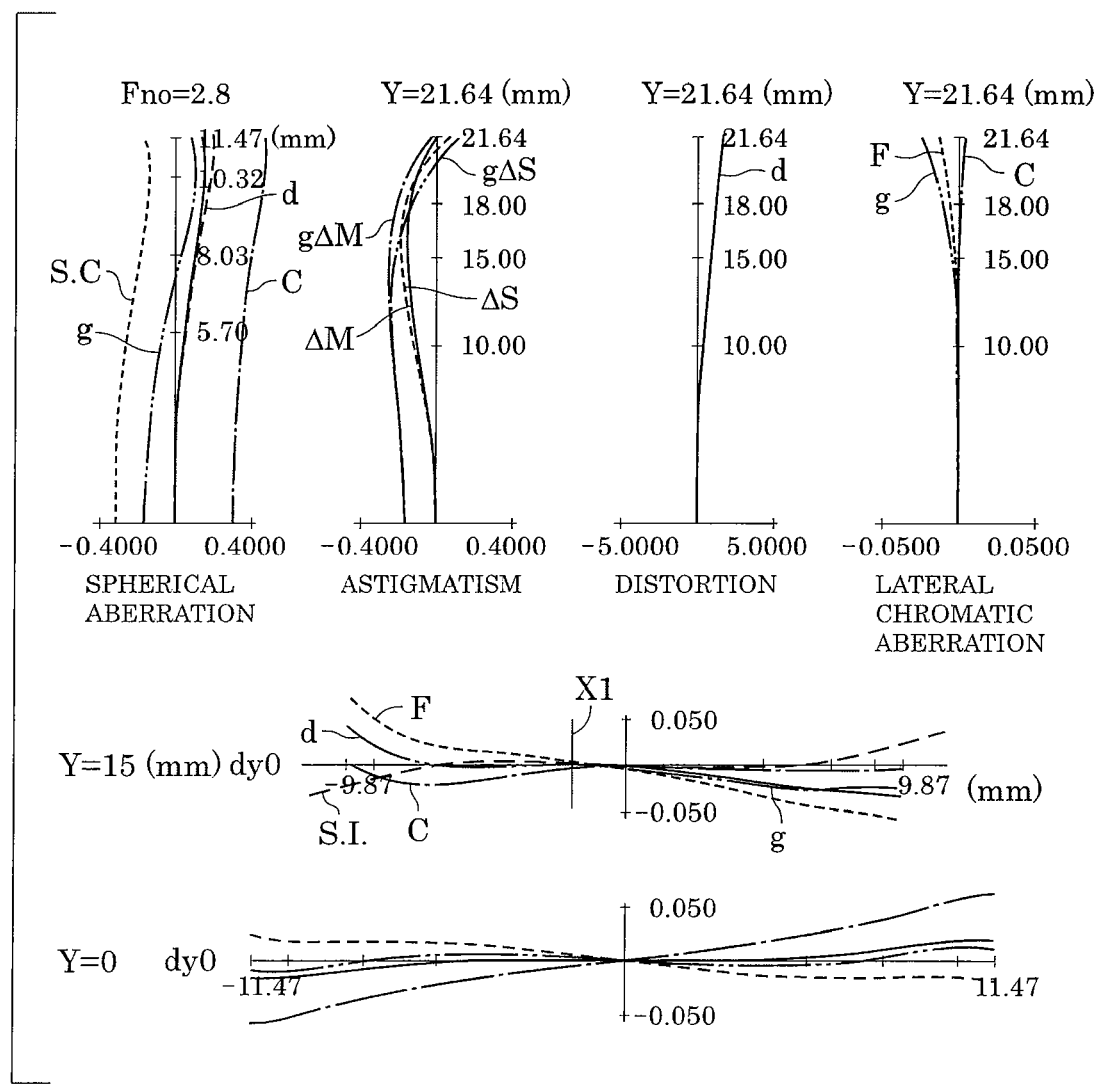
FIG. 10 illustrates aberration, astigmatism, and distortion of a photographic lens system according to the exemplary embodiment shown in FIGS. 7A to 7C in a normal mode ($\beta=-1$).

FIGS. 8 to 10 illustrate aberrations, astigmatism, and distortion of the photographic lens system in accordance with the second exemplary embodiment. FIG. 8 illustrates the aberrations, astigmatism, and distortion of the photographic lens system being focused on an infinite or distant object. FIG. 9 illustrates the aberrations, astigmatism, and distortion of the photographic lens system being focused on a close-up object with a magnification of β=0.5. FIG. 10 illustrates the aberrations, astigmatism, and distortion of the photographic lens system being focused on a close-up object with life-size magnification (β=1).

Figure 11:
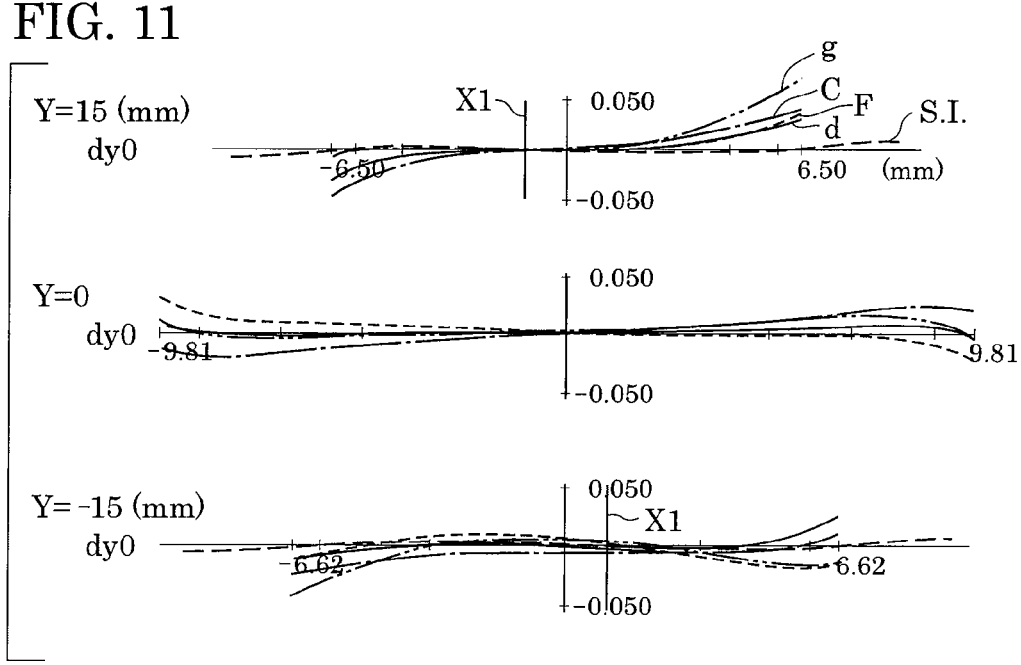
FIG. 11 illustrates aberrations, astigmatism, and distortion of a photographic lens system according to the exemplary embodiment shown in FIGS. 7A to 7C in an image stabilizing mode (for an infinite or distant object).
Figure 12:
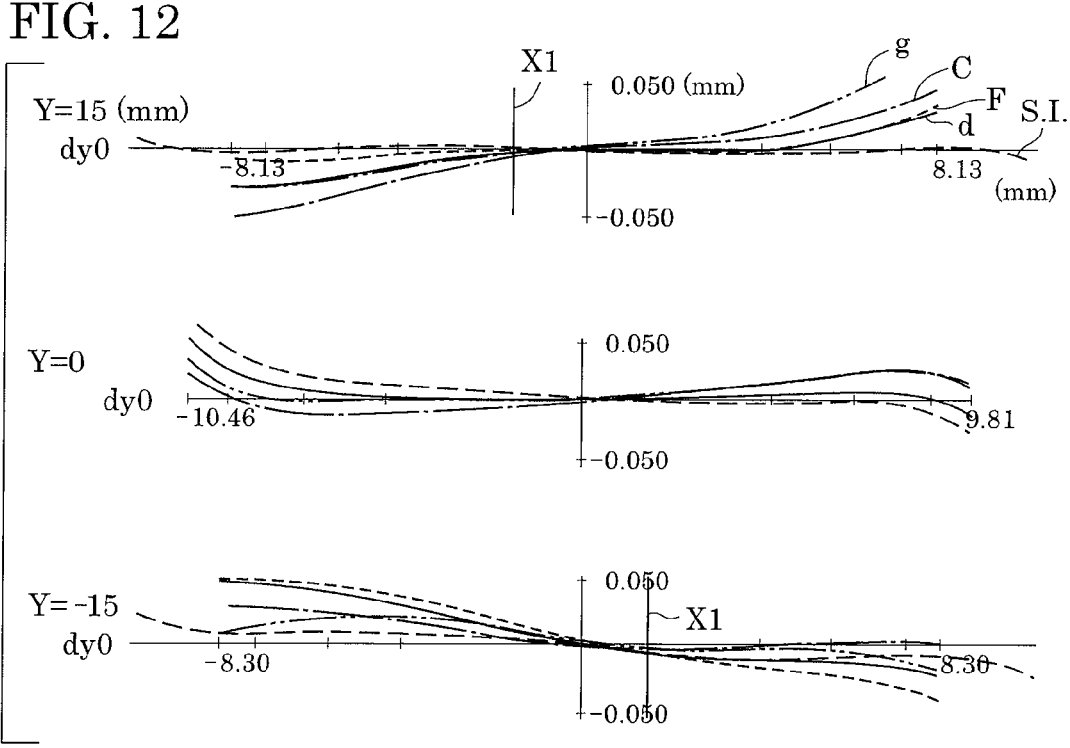
FIG. 12 illustrates aberrations, astigmatism, and distortion of a photographic lens system according to the exemplary embodiment shown in FIGS. 7A to 7C in an image stabilizing mode ($\beta=-0.5$).

FIGS. 11 and 12 illustrate aberrations, astigmatism, and distortion of the photographic lens system in accordance with the second exemplary embodiment in an image stabilizing mode wherein an image shift corresponding to a 3° tilt of the optical axis is compensated for. FIG. 11 illustrates the photographic lens system being focused on an infinite or distant object. FIG. 12 illustrates the photographic lens system being focused on a close-up object with a magnification of β=0.5.

A photographic lens system in accordance with one of the first and second exemplary embodiments may be an inner focus macro-lens system having a photographic angle of view (effective angle of view) of 24° and an F number of about 2.8 and can be used for an image pickup apparatus (e.g., a video camera, digital camera, a film camera, equivalents, and other image capturing devices as known by one of ordinary skill in the relevant art).

In the cross-sectional views of the lens system, the left side is the object side (front) and the right side is the image side (rear).

Each figure illustrating a cross-section including lens units that can have various positive and negative refractive powers. In at least one exemplary embodiment a cross-section can include a first lens unit L1 having a positive refractive power (i.e., optical power, which is equal to an inverse of the focal length) a second lens unit L2 having a negative refractive power, a third lens unit L3 having a positive refractive power, and a fourth lens unit L4 having a negative refractive power. The first lens unit L1 can further include a first lens subunit L1a having a negative refractive power and a second lens subunit L1b having a positive refractive power.

An aperture stop SP can be interposed between the second lens unit L2 and the third lens unit L3. An image plane IP can be the surface of various imaging devices (e.g., a solid-state image pickup device (e.g., photoelectric transducer), a charge-coupled device (CCD), a complementary metal-oxide semiconductor (CMOS) sensor, a photo-sensitized material (e.g., film), other imaging surfaces as known by one of ordinary skill in the relevant art, and equivalents).

The lens structure of inner focus macro-lens systems (e.g., photographic lens systems) in accordance with the first and second exemplary embodiments will be described below.

When the photographic lens system in accordance with one of the first and second exemplary embodiments is focused from an infinite or distant object to a close-up object, the first lens unit L1 doesn't move for focusing, the second lens unit L2 moves to the image side (X, XA), and the third lens unit L3 moves to the object side (Y, YA). By moving the second lens unit L2 and the third lens unit L3 in opposite directions (XA and YA), the overall length of the lens system (i.e., the distance from the lens surface closest to the object to the image place) can be maintained approximately at a constant length while imaging (e.g., photographing) an object at an infinite or distant position to a close-up position with a life-size magnification. When focusing from an infinite or distant object to a close-up object, the fourth lens unit L4 can move (Z, ZA) along a convex trajectory (as viewed when the motion is plotted on an axis of time versus position).

The second lens subunit L1b is movable in a direction which includes a vector component orthogonal to the optical axis. A blurring of an image due to vibration of the image pickup apparatus can be reduced by moving the image location of the overall photographic lens system in a direction orthogonal to the optical axis by moving the second lens subunit L1b in a direction (V) which includes a vector component orthogonal to the optical axis.

In at least one exemplary embodiment (e.g. the exemplary embodiments illustrated in FIGS. 1 and 7), the photographic lens system can satisfy certain design values.

For example, in at least one exemplary embodiment, the photographic lens system can have a design value:

$$d_{sp}/f > 0.8 \quad (1)$$

where $d_{sp}$ represents the distance from the aperture stop SP to a first lens surface closest to the object side and f represents the focal length of the overall photographic lens system.

Formula (1) presented above represents the position of the aperture stop SP for the particular exemplary embodiment discussed, although other exemplary embodiments can have other values outside the values stated in formula 1.

To improve performance of the mounted mechanism that performs the image stabilizing function, where there is a small fluctuation of aberration during image stabilization, the size and weight of the lens unit (image stabilizing lens unit) that is movable (e.g., in a direction which includes a vector component orthogonal to the optical axis), in an image stabilizing mode, should be reduced. To reduce the size and weight of the lens unit that moves partially orthogonal to the optical axis (e.g., L1b), the effective diameter of the lens closest to the object in the first lens unit L1 should be reduced. When $d_{sp}/f$ falls below the lower limit of Formula (1), the distance from the aperture stop SP to the lens closest to the object becomes larger. Consequently, reducing the effective diameter of the first lens unit L1 becomes more difficult. For example, it can become difficult to reduce the effective diameter of the second lens subunit L1b.

In yet at another exemplary embodiment, the range in Formula (1) can be set as below:

$$d_{sp}/f > 0.84 \quad (1a)$$

Moreover, in another exemplary embodiment, the upper limit can be set to 1.2 or can be set to 1.0.

The second lens subunit L1b, which is the image stabilizing lens unit, can include at least a positive lens and a negative lens so as to sufficiently reduce fluctuation of aberration when the lenses are decentered (i.e., moved orthogonal to the optical axis).

Spherical aberration and off-axis aberration (coma and astigmatism) are reduced by employing aspherical surfaces for the lens surface closest to the object and the lens surface closest to the image of the photographic lens system in accordance with one of the first and second exemplary embodiments.

According to at least one exemplary embodiment, as described herein, by specifying each element in the photographic lens, the image formed by the photographic lens can be displaced so as to reduce optical blurring of the image when the photographic lens is vibrated (or when the image pickup apparatus is tilted). In this way, a still image can be obtained and the photographed image can have improved stabilization.

Details of the structure of the lens units in accordance with the first and second exemplary embodiments will be described below.

The first lens subunit L1a can include a negative lens unit having a concave surface on the image side.

The second lens subunit L1b can include, in order from the object side to the image side, a biconvex positive lens and a combination lens of a positive lens and a negative lens. Note that, in other exemplary embodiments (e.g., as shown in FIGS. 1 and 13), the lenses can have various shapes (e.g., a bi-convex positive lens can be replaced with a positive lens having one side flat with the remaining side convex).

The second lens unit L2 can include, in order from the object side to the image side, a negative lens having a concave surface on the image side and a combination lens of a concave negative lens and a positive lens.

The third lens unit L3 can include, in order from the object side to the image side, a biconvex positive lens and a combination lens of a positive lens and a negative lens.

The fourth lens unit L4 can include a negative lens having a concave surface on the image side, a positive lens having a convex surface on the object side, and a negative meniscus lens having a concave surface on the image side.

The size of the overall lens system can be reduced by operatively connecting the lens units as described above. At the same time, when an inner focus system, is employed, fluctuation of various aberrations, astigmatism, and distortion can be reduced when focusing from an infinite or distant object to a close-up object at a life-size magnification. Accordingly, the lens system can be used as a macro-lens system capable of reducing aberrations astigmatism, and distortion in both a normal mode and an image stabilizing mode.

The numerical data corresponding to the first and second exemplary embodiments are shown as first and second numerical examples respectively, below.

In the numerical examples, i represents the number of lens surfaces counted from the object side, ri represent the radius of curvature of the ith surface, di represents the distance between ith surface and the (i+1)th surface, ni represents the d-line refractive index of the ith optical material, and Vi represents the d-line Abbe number of the ith optical material.

The shape of an aspherical surface is represented by formula (1c):

$$x = \{(h^2/R)/[1+\{1-(h/R)^2\}^{1/2}]\} + C4 \cdot h^4 + C6 \cdot h^6 + C8 \cdot h^8 + C10 \cdot h^{10} + C12 \cdot h^{12} \quad (1c)$$

where C4, C6, C8, C10, and C12 are aspherical coefficients, h is the height from the optical axis, and x is the displacement of the optical axis at height h with reference to a surface vertex. R represents the radius of curvature. In the following, "e-0X" is equivalent to "×10$^{-x}$," f represents the focal length, and Fno represents an F number.

Moreover, −0.5X and −1.0X indicate that the imaging magnification is −0.5 and −1, respectively.

First Numerical Example

| | | f = 57.634, Fno = 2.8 | | |
|---|---|---|---|---|
| | | r | d | n | v |
| ✳ | 1 | −1932.87465 | 1.49487 | 1.651597 | 58.55 |
| | 2 | 31.13551 | 9.00143 | 1 | 0 |
| | 3 | 205.68949 | 3.92331 | 1.806098 | 40.92 |
| | 4 | −42.70953 | 0.18255 | 1 | 0 |

-continued

| | f = 57.634, Fno = 2.8 | | | |
|---|---|---|---|---|
| 5 | 43.05081 | 6.18282 | 1.651597 | 58.55 |
| 6 | −45.09328 | 1.8368 | 1.84666 | 23.78 |
| 7 | 1086.82486 | variable | 1 | 0 |
| 8 | 317.64997 | 1.39107 | 1.834807 | 42.72 |
| 9 | 30.27889 | 3.8627 | 1 | 0 |
| 10 | −30.52061 | 2.50425 | 1.651597 | 58.55 |
| 11 | 32.242 | 8.02303 | 1.799516 | 42.22 |
| 12 | −30.92281 | variable | 1 | 0 |
| 13 | aperture stop | variable | 1 | 0 |
| 14 | 84.23539 | 3.84201 | 1.603112 | 60.64 |
| 15 | −48.37233 | 0.12621 | 1 | 0 |
| 16 | 59.95165 | 4.70546 | 1.58913 | 61.14 |
| 17 | −41.4104 | 1.17092 | 1.84666 | 23.78 |
| 18 | 1069.69215 | variable | 1 | 0 |
| 19 | 210.78955 | 1.17092 | 1.754998 | 52.32 |
| 20 | 24.74252 | 2.98722 | 1 | 0 |
| 21 | 28.58623 | 3.32356 | 1.755199 | 27.51 |
| 22 | 45 | 2.38804 | 1 | 0 |
| 23 | 54.72372 | 1.97583 | 1.517417 | 52.43 |
| ※ 24 | 51.19978 | | 1 | 0 |

| | ∞ | −0.5 x | −1.0 x |
|---|---|---|---|
| 7 | 1.64598 | 5.52754 | 10.42483 |
| 12 | 9.23727 | 5.3556 | 0.458591 |
| 13 | 20.41087 | 9.152855 | 3.785939 |
| 18 | 1.37891 | 7.976494 | 17.8653 |

| Aspherical Coefficients | | |
|---|---|---|
| r | 1 | 24 |
| C4 | −5.28031E−06 | 1.38831E−06 |
| C6 | −1.08639E−09 | −5.92801E−09 |
| C8 | 3.06050E−11 | −9.25603E−12 |
| C10 | −8.16631E−14 | 2.38886E−13 |
| C12 | 7.11577E−17 | −6.26447E−16 |

$d_{sp} = 49.377$
$d_{sp}/f = 0.857$

Second Numerical Example

| | f = 57.720 Fno = 2.8 | | | |
|---|---|---|---|---|
| | r | d | n | ν |
| ※ 1 | −2669.52985 | 1.58598 | 1.651597 | 58.55 |
| 2 | 31.1547 | 8.9332 | 1 | 0 |
| 3 | 218.0019 | 3.64715 | 1.806098 | 40.92 |
| 4 | −42.55596 | 0.20691 | 1 | 0 |
| 5 | 43.28972 | 6.20025 | 1.651597 | 58.55 |
| 6 | −45.2218 | 1.842 | 1.84666 | 23.78 |
| 7 | 1024.90916 | variable | 1 | 0 |
| 8 | 314.01914 | 1.3894 | 1.834807 | 42.72 |
| 9 | 30.5252 | 3.85434 | 1 | 0 |
| 10 | −30.37215 | 2.5851 | 1.651597 | 58.55 |
| 11 | 32.56016 | 8.02122 | 1.799516 | 42.22 |
| 12 | −30.88788 | variable | 1 | 0 |
| 13 | aperture stop | variable | 1 | 0 |
| 14 | 84.25045 | 3.84409 | 1.603112 | 60.64 |
| 15 | −48.22319 | 0.1424 | 1 | 0 |
| 16 | 58.9591 | 4.72421 | 1.58913 | 61.14 |
| 17 | −41.58164 | 1.1743 | 1.84666 | 23.78 |
| 18 | 892.66359 | variable | 1 | 0 |
| 19 | 209.80677 | 1.1786 | 1.754998 | 52.32 |
| 20 | 24.68702 | 2.99783 | 1 | 0 |
| 21 | 28.55564 | 3.32233 | 1.755199 | 27.51 |
| 22 | 45 | 2.40269 | 1 | 0 |
| 23 | 54.87949 | 1.98334 | 1.517417 | 52.43 |
| ※ 24 | 51.06703 | | 1 | 0 |

-continued

| | f = 57.720 Fno = 2.8 | | |
|---|---|---|---|
| | ∞ | −0.5 x | −1.0 x |
| 7 | 1.63512 | 5.53307 | 10.48238 |
| 12 | 9.241013 | 5.342845 | 0.393905 |
| 13 | 20.35405 | 9.149529 | 3.791381 |
| 18 | 1.373377 | 7.984293 | 17.87444 |

| Aspherical Coefficients | | |
|---|---|---|
| r | 1 | 24 |
| C4 | −5.24981E−06 | 1.38831E−06 |
| C6 | −1.26445E−09 | −5.92801E−09 |
| C8 | 3.11059E−11 | −9.25603E−12 |
| C10 | −8.15992E−14 | 2.38886E−13 |
| C12 | 6.81448E−17 | −6.26447E−16 |

$d_{sp} = 49.14$
$d_{sp}/f = 0.851$

A photographic lens system in accordance with third to seventh exemplary embodiments will now be described. By providing an image stabilizing lens unit having a desired refractive power, a photographic lens system, in accordance with at least one exemplary embodiment, can improve stabilization of an image and reduce fluctuations of aberrations, astigmatism, and distortion during focusing.

FIGS. 13A and 13B illustrate cross-sectional views of a photographic lens system in accordance with a third exemplary embodiment. FIG. 13A illustrates the photographic lens system being focused on an infinite or distant object, and FIG. 13B illustrates the photographic lens system being focused on a close-up object at a magnification of β=−1 (life size).

FIGS. 14A and 14B illustrate aberrations, astigmatism, and distortion of the photographic lens system in accordance with the third exemplary embodiment in a normal mode (i.e., when the image stabilizing function is not activated). FIG. 14A illustrates aberrations, astigmatism, and distortion for when the photographic lens system is focused on an infinite or distant object, and FIG. 14B illustrates aberrations, astigmatism, and distortion for when the photographic lens system is focused on a close-up object at a magnification of β=−1.0.

Figure 15A:
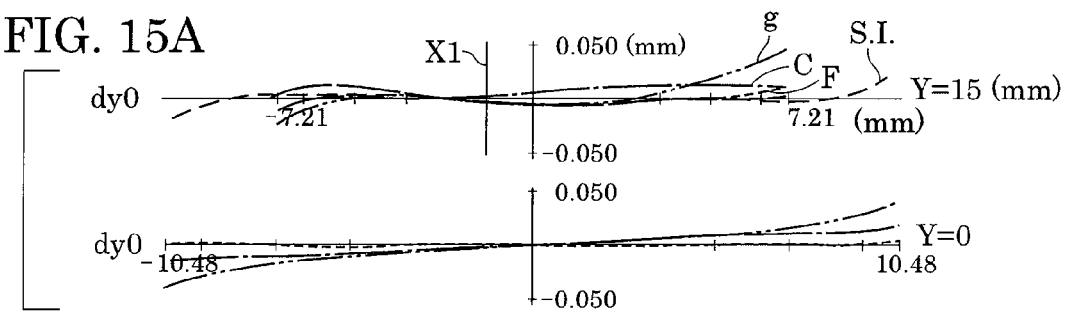
FIGS. 15A to 15D illustrate lateral aberrations of a photographic lens system according to the exemplary embodiment shown in FIGS. 13A and 13B.
Figure 15B:
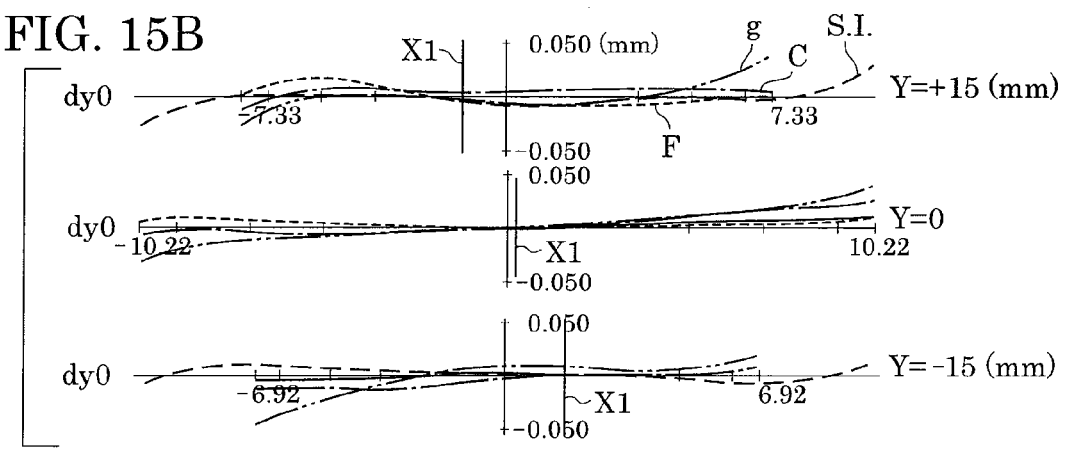
Figure 15C:
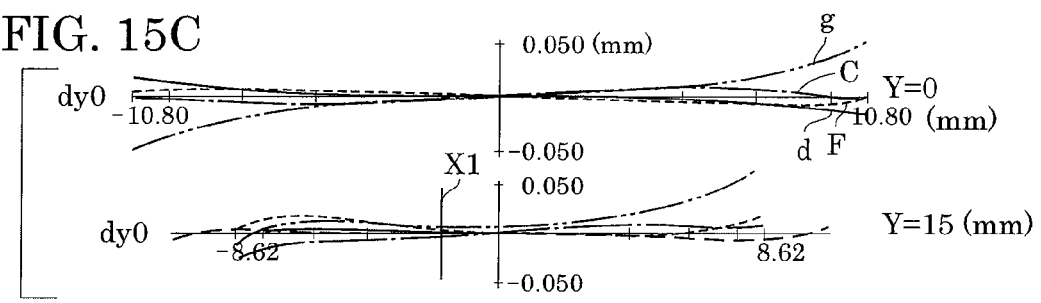
Figure 15D:
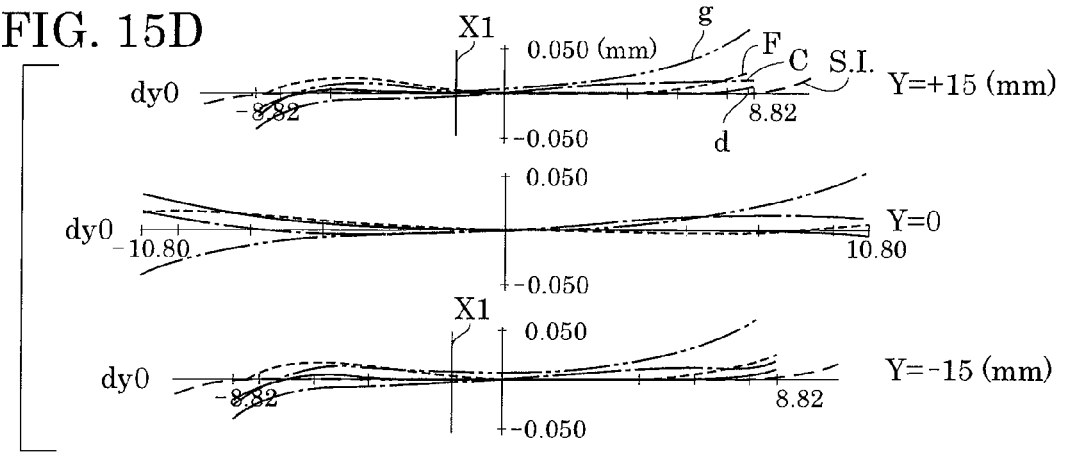

FIGS. 15A to 15D illustrate lateral aberrations of a photographic lens system in accordance with the third exemplary embodiment. FIG. 15A illustrates the lateral aberrations for when the photographic lens system is focused on an infinite or distant object in a normal mode; FIG. 15B illustrates lateral aberrations of the photographic lens system in an image stabilizing mode wherein an image shift corresponding to a 3° tilt of the optical axis is compensated for when the photographic lens system is focused on an infinite or distant object; FIG. 15C illustrates lateral aberrations for when the photographic lens system is focused on a close-up object at a magnification of β=−0.33 in a normal mode; and FIG. 15D illustrates lateral aberrations of the photographic lens system in an image stabilizing mode wherein an image shift corresponding to a 3° tilt of the optical axis is compensated for when the photographic lens system is focused on a close-up object at a magnification of β=−0.33.

FIGS. 16A and 16B illustrate cross-sectional views of a photographic lens system in accordance with a fourth exemplary embodiment. FIG. 16A illustrates the photographic lens system being focused on an infinite or distant object, and FIG. 16B illustrates the photographic lens system being focused on a close-up object at a magnification of β=−1 (life size).

Figure 17A:
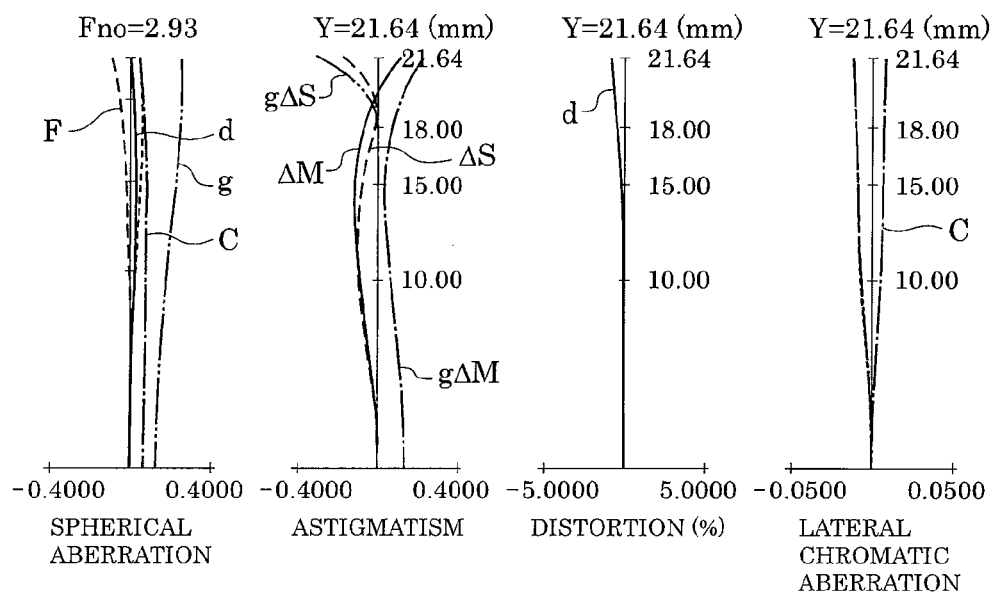
FIGS. 17A and 17B illustrate aberrations, astigmatism, and distortion of a photographic lens system according to the exemplary embodiment shown in FIGS. 16A and 16B.
Figure 17B:
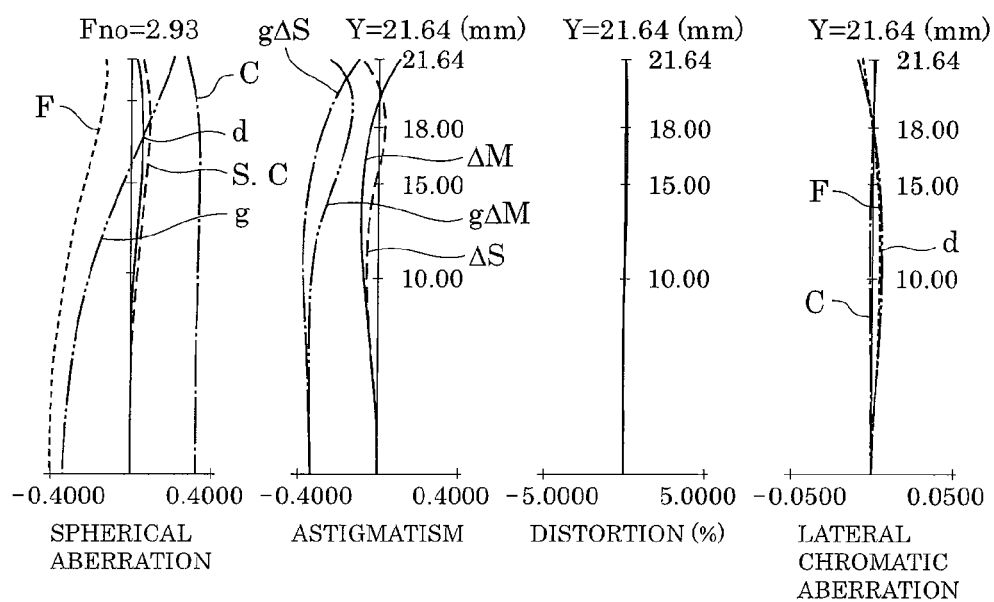

FIGS. 17A and 17B illustrate aberrations, astigmatism, and distortion of the photographic lens system in accordance with the fourth exemplary embodiment in a normal mode. FIG. 17A illustrates aberrations, astigmatism, and distortion for when the photographic lens system is focused on an infinite or distant object, and FIG. 17B illustrates aberrations, astigmatism, and distortion for when the photographic lens system is focused on a close-up object at a magnification of β=−1.0.

Figure 18A:
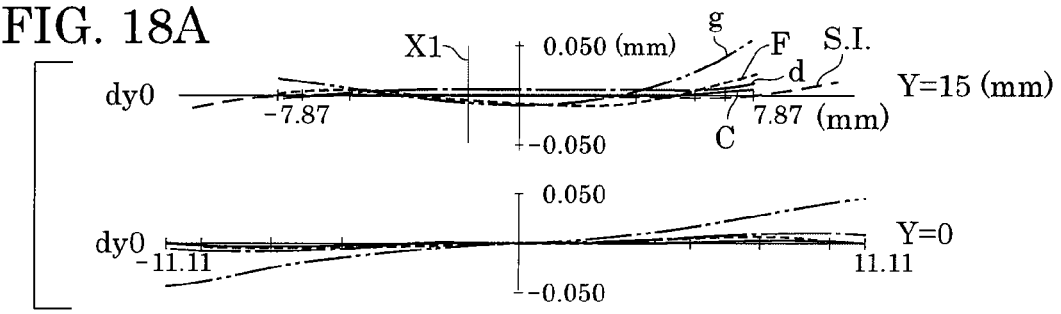
FIGS. 18A to 18D illustrate lateral aberrations of a photographic lens system according to the exemplary embodiment shown in FIGS. 16A and 16B.
Figure 18B:
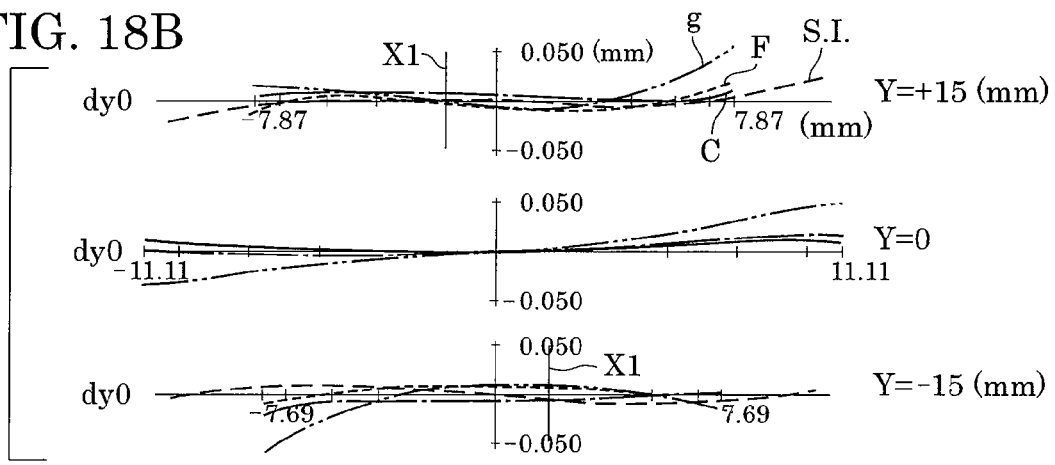
Figure 18C:
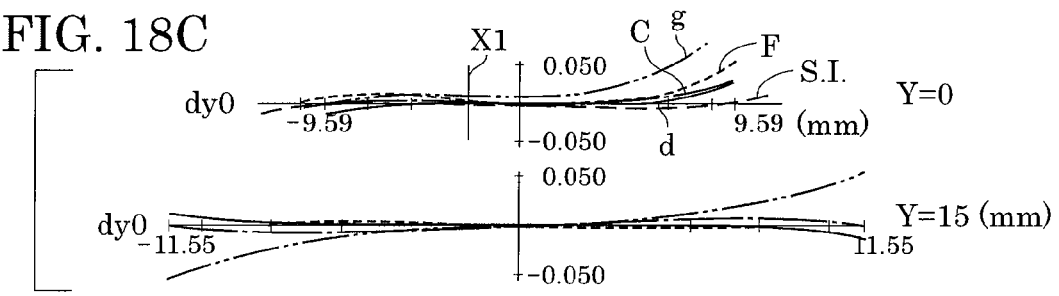
Figure 18D:
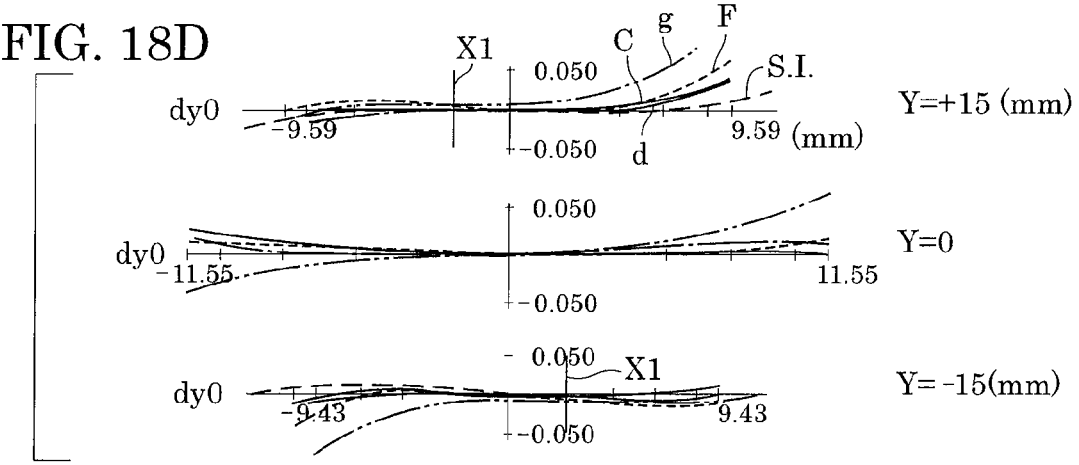

FIGS. 18A to 18D illustrate lateral aberrations of a photographic lens system in accordance with a fourth exemplary embodiment. FIG. 18A illustrates the lateral aberrations for when the photographic lens system is focused on an infinite or distant object in a normal mode; FIG. 18B illustrates lateral aberrations of the photographic lens system in an image stabilizing mode wherein an image shift corresponding to a 3° tilt of the optical axis is compensated for when the photographic lens system is focused on an infinite or distant object; FIG. 18C illustrates lateral aberrations for when the photographic lens system is focused on a close-up object at a magnification of β=−0.33 in a normal mode; and FIG. 18D illustrates lateral aberrations of the photographic lens system in an image stabilizing mode wherein an image shift corresponding to a 3° tilt of the optical axis is compensated for when the photographic lens system is focused on a close-up object at a magnification of β=−0.33.

FIGS. 19A and 19B illustrate cross-sectional views of a photographic lens system in accordance with a fifth exemplary embodiment. FIG. 19A illustrates the photographic lens system being focused on an infinite or distant object, and FIG. 19B illustrates the photographic lens system being focused on a close-up object at a magnification of β=−1 (life size).

FIGS. 20A and 20B illustrate aberrations, astigmatism, and distortion of the photographic lens system in accordance with the fifth exemplary embodiment in a normal mode. FIG. 20A illustrates aberrations, astigmatism, and distortion for when the photographic lens system is focused on an infinite or distant object, and FIG. 20B illustrates aberrations, astigmatism, and distortion for when the photographic lens system is focused on a close-up object at a magnification of β=−1.0.

Figure 21A:
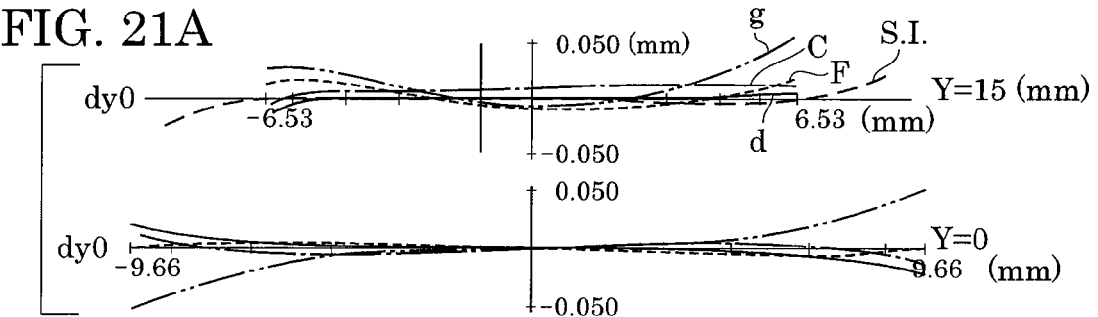
FIGS. 21A to 21D illustrate lateral aberrations of a photographic lens system according to the exemplary embodiment shown in FIGS. 19A and 19B.
Figure 21B:
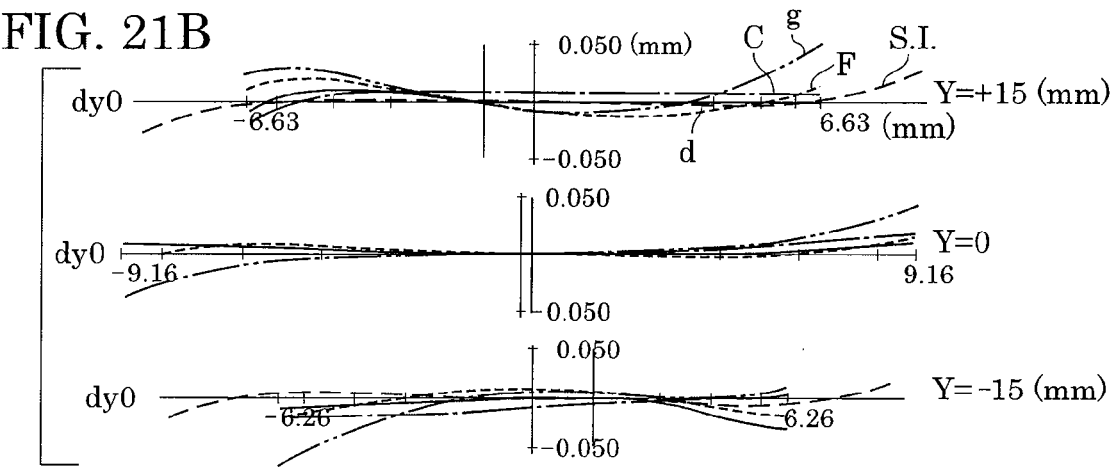
Figure 21C:
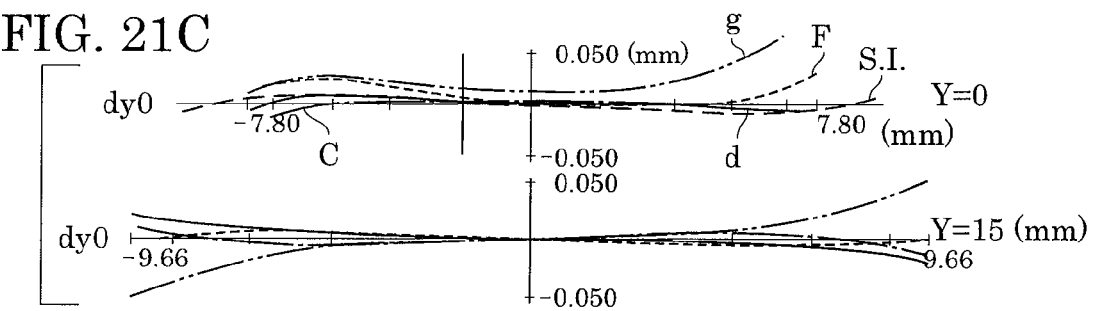
Figure 21D:
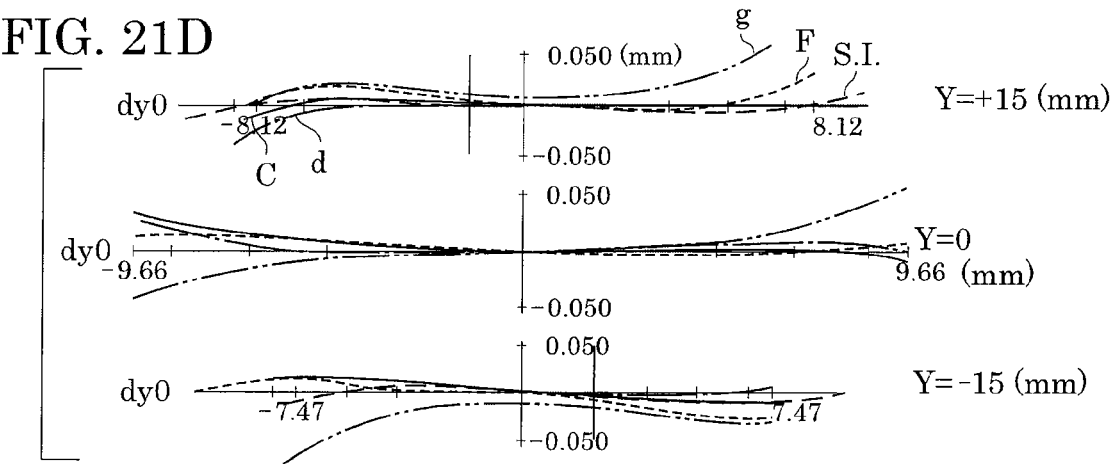

FIGS. 21A to 21D illustrate lateral aberrations of a photographic lens system in accordance with the fifth exemplary embodiment. FIG. 21A illustrates the lateral aberrations for when the photographic lens system is focused on an infinite or distant object in a normal mode; FIG. 21B illustrates lateral aberrations of the photographic lens system in an image stabilizing mode wherein an image shift corresponding to a 3° tilt of the optical axis is compensated for when the photographic lens system is focused on an infinite or distant object; FIG. 21C illustrates lateral aberrations for when the photographic lens system is focused on a close-up object at a magnification of β=−0.33 in a normal mode; and FIG. 21D illustrates lateral aberrations of the photographic lens system in an image stabilizing mode wherein an image shift corresponding to a 3° tilt of the optical axis is compensated for when the photographic lens system is focused on a close-up object at a magnification of β=−0.33.

FIGS. 22A and 22B illustrate cross-sectional views of a photographic lens system in accordance with a sixth exemplary embodiment. FIG. 22A illustrates the photographic lens system being focused on an infinite or distant object, and FIG. 22B illustrates the photographic lens system being focused on a close-up object at a magnification of β=−1 (life size).

Figure 23A:
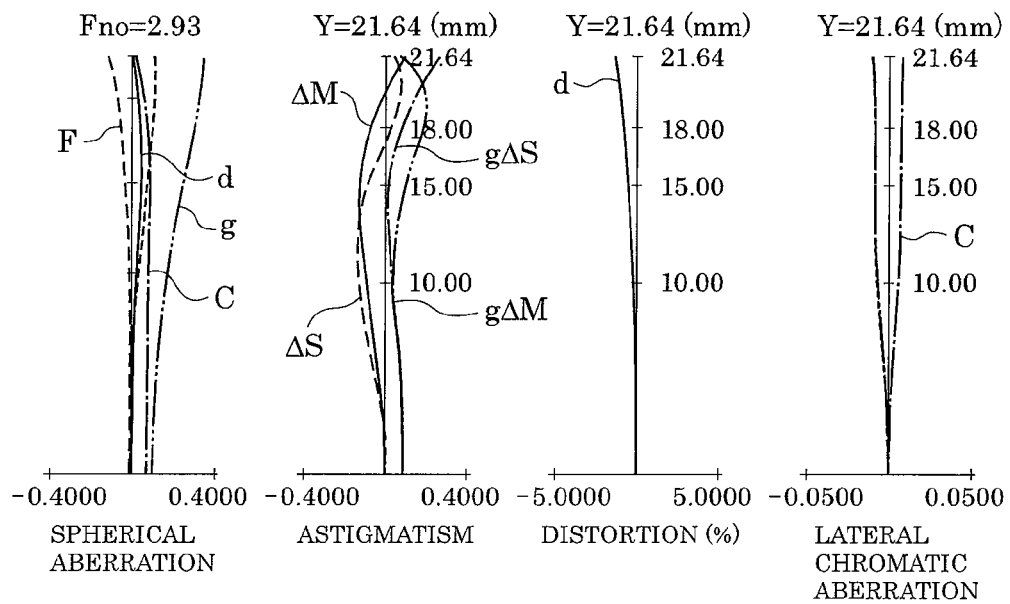
FIGS. 23A and 23B illustrate aberrations, astigmatism, and distortion of a photographic lens system according to the exemplary embodiment shown in FIGS. 22A and 22B.
Figure 23B:
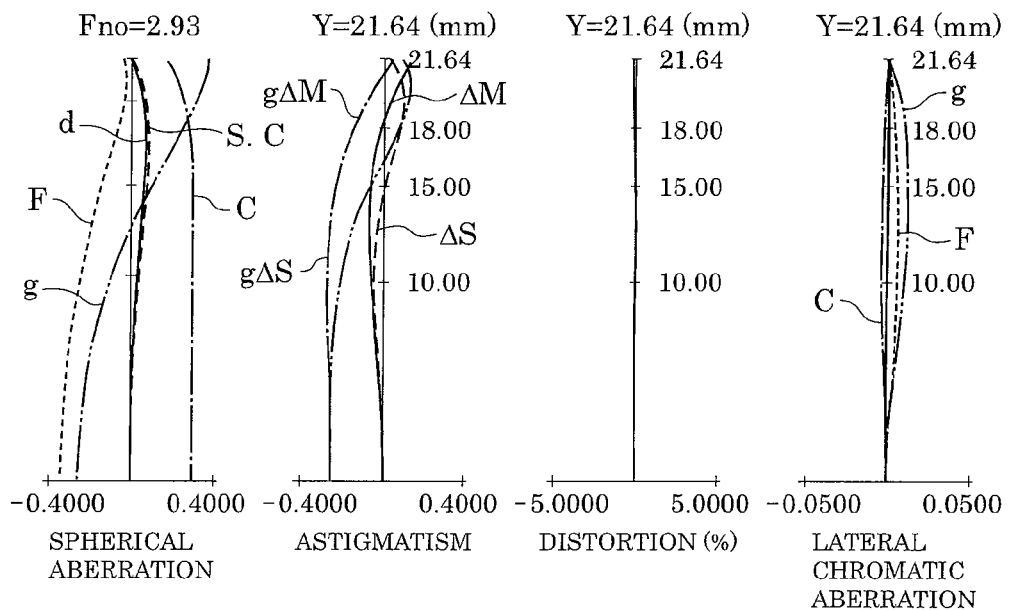

FIGS. 23A and 23B illustrate aberrations, astigmatism, and distortion of the photographic lens system in accordance with the sixth exemplary embodiment in a normal mode. FIG. 23A illustrates aberrations, astigmatism, and distortion for when the photographic lens system is focused on an infinite or distant object, and FIG. 23B illustrates aberrations, astigmatism, and distortion for when the photographic lens system is focused on a close-up object at a magnification of β=−1.0.

Figure 24A:
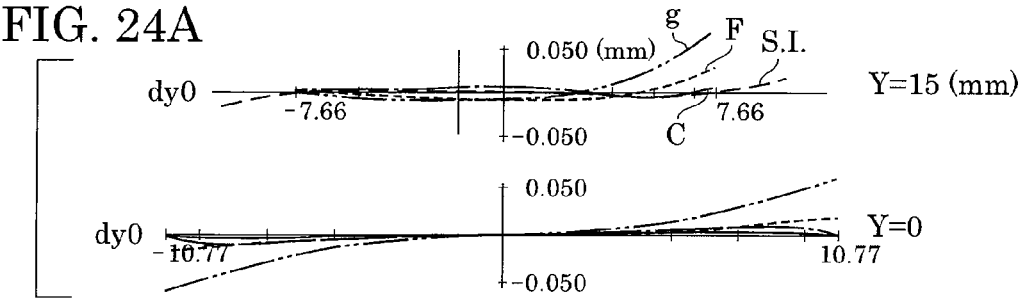
FIGS. 24A to 24D illustrate lateral aberrations of a photographic lens system according to the exemplary embodiment shown in FIGS. 22A and 22B.
Figure 24B:
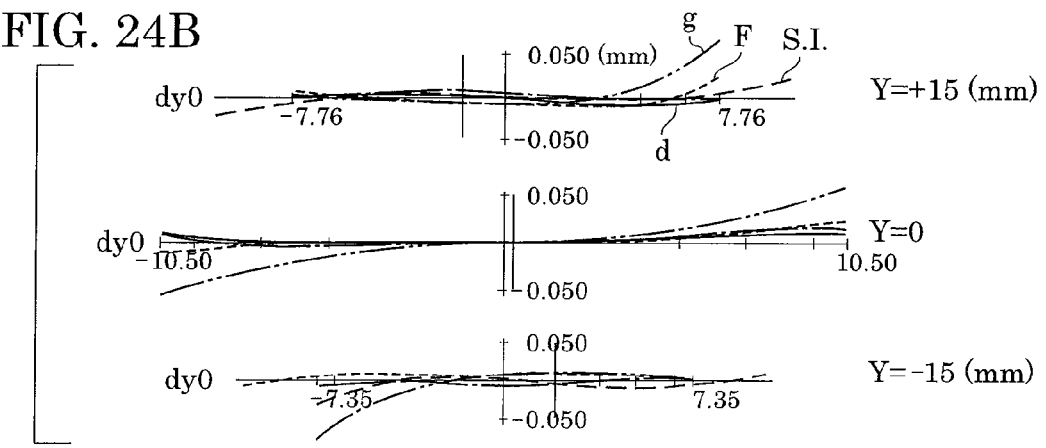
Figure 24C:
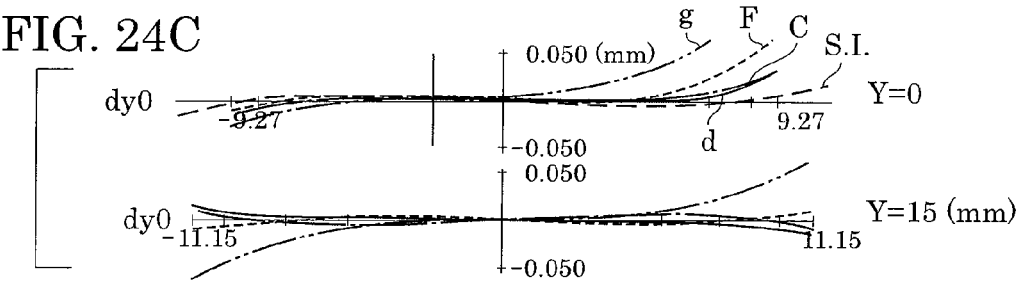
Figure 24D:
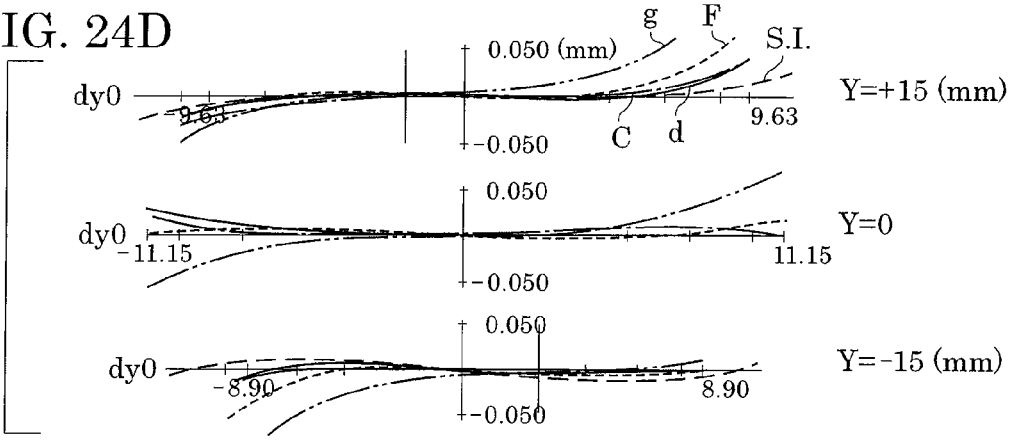

FIGS. 24A to 24D illustrate lateral aberrations of a photographic lens system in accordance with the sixth exemplary embodiment. FIG. 24A illustrates the lateral aberrations for when the photographic lens system is focused on an infinite or distant object in a normal mode; FIG. 24B illustrates lateral aberrations of the photographic lens system of the photographic lens system in an image stabilizing mode wherein an image shift corresponding to a 3° tilt of the optical axis is compensated for when the photographic lens system is focused on an infinite or distant object; FIG. 24C illustrates lateral aberrations for when the photographic lens system is focused on a close-up object at a magnification of β=−0.33 in a normal mode; and FIG. 24D illustrates lateral aberrations of the photographic lens system in an image stabilizing mode wherein an image shift corresponding to a 3° tilt of the optical axis is compensated for when the photographic lens system is focused on a close-up object at a magnification of β=−0.33.

Figure 25:
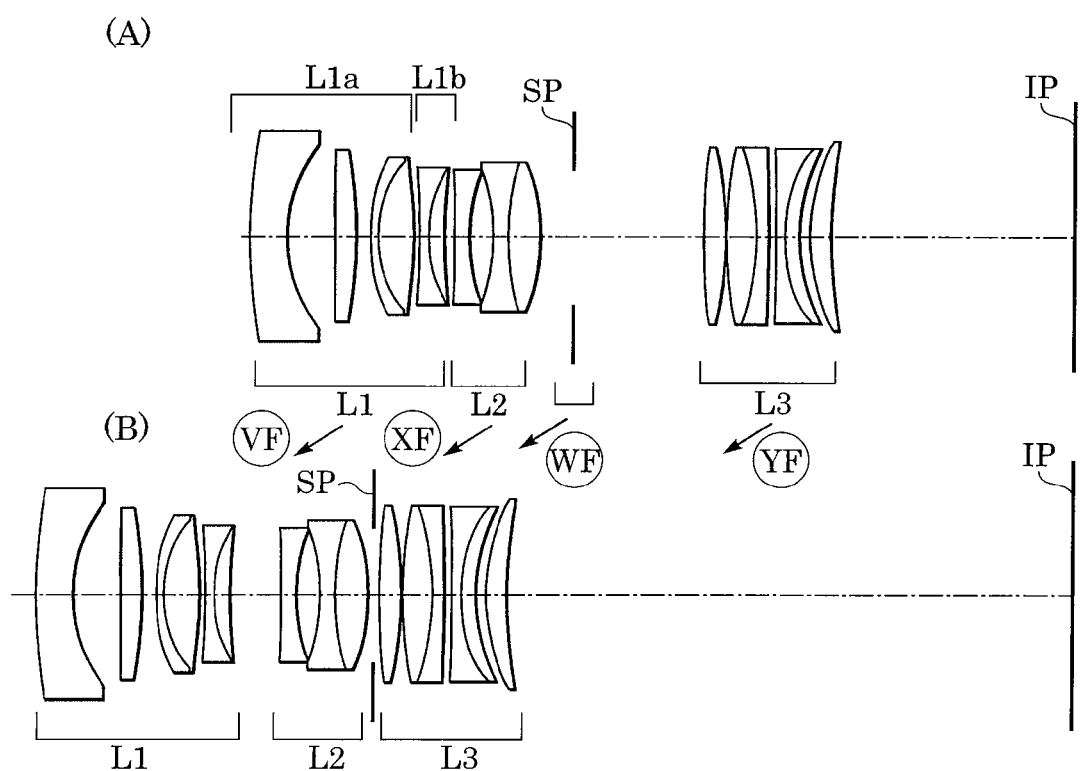
FIGS. 25A and 25B illustrate cross-sectional views of a photographic lens system according to at least one further exemplary embodiment.

FIGS. 25A and 25B illustrate cross-sectional views of a photographic lens system in accordance with a seventh exemplary embodiment. FIG. 25A illustrates the photographic lens system being focused on an infinite or distant object, and FIG. 25B illustrates the photographic lens system being focused on a close-up object at a magnification of β=−1 (life size).

FIGS. 26A and 26B illustrate aberrations, astigmatism, and distortion of the photographic lens system in accordance with the seventh exemplary embodiment in a normal mode. FIG. 26A illustrates aberrations, astigmatism, and distortion for when the photographic lens system is focused on an infinite or distant object, and FIG. 26B illustrates aberrations, astigmatism, and distortion for when the photographic lens system is focused on a close-up object at a magnification of β=−1.0.

Figure 27A:
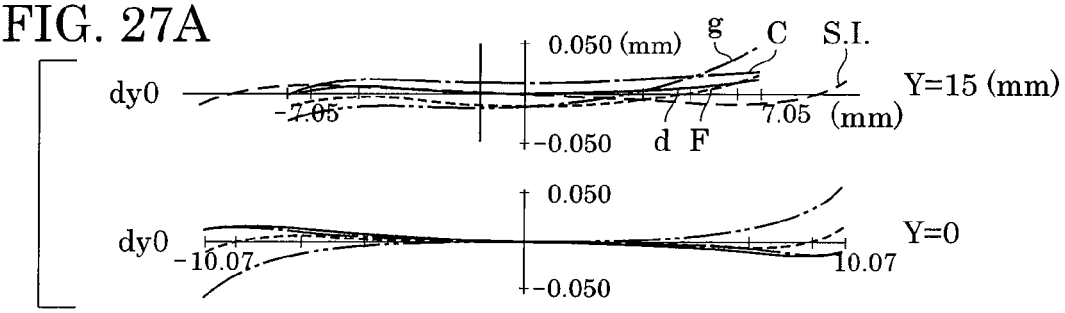
FIGS. 27A to 27D illustrate lateral aberrations of a photographic lens system according to the exemplary embodiment shown in FIGS. 25A and 25B.
Figure 27B:
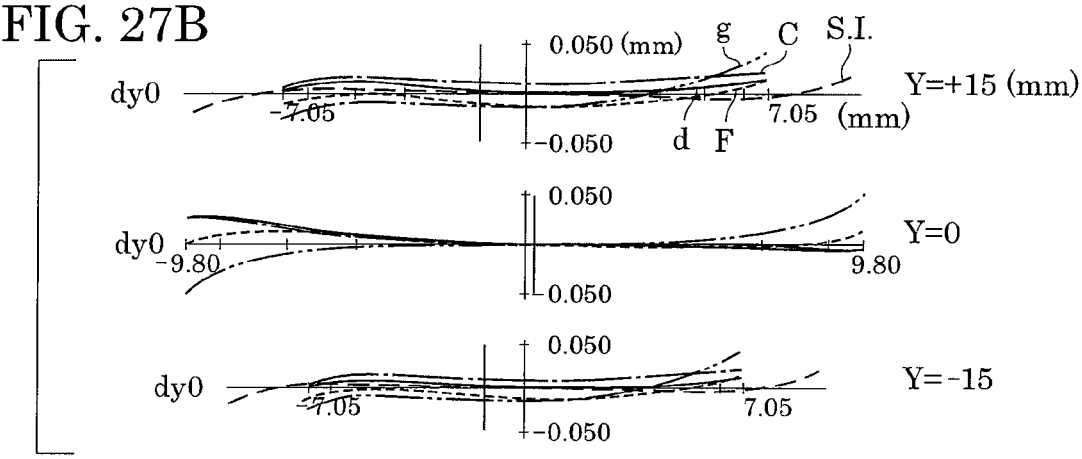
Figure 27C:
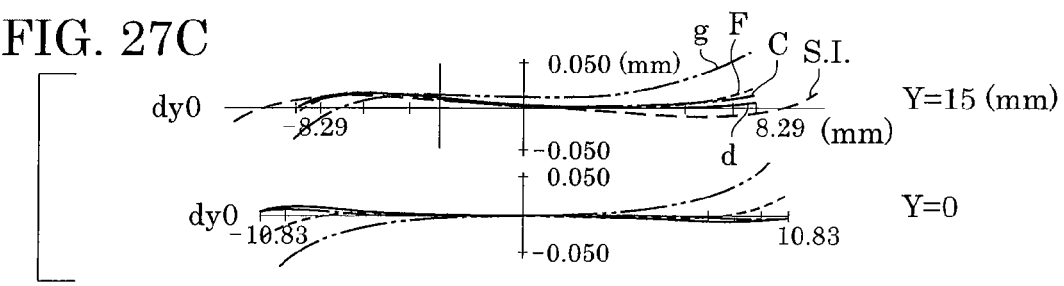
Figure 27D:
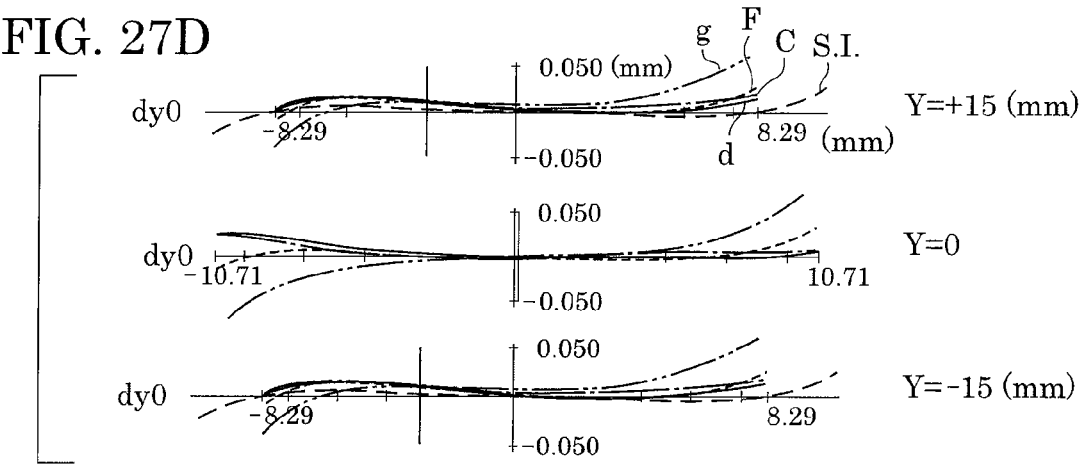

FIGS. 27A to 27D illustrate lateral aberrations of a photographic lens system in accordance with the seventh exemplary embodiment. FIG. 27A illustrates the lateral aberrations for when the photographic lens system is focused on an infinite or distant object in a normal mode; FIG. 27B illustrates lateral aberrations of the photographic lens system in an image stabilizing mode wherein an image shift corresponding to a 3° tilt of the optical axis is compensated for when the photographic lens system is focused on an infinite or distant object; FIG. 27C illustrates lateral aberrations for when the photographic lens system is focused on a close-up object at a magnification of β=−0.33 in a normal mode; and FIG. 27D illustrates lateral aberrations of the photographic lens system in an image stabilizing mode wherein an image shift corresponding to a 3° tilt of the optical axis is compensated for when the photographic lens system is focused on a close-up object at a magnification of β=−0.33.

A photographic lens systems in accordance with one of the third to seventh exemplary embodiments may be an inner focus macro-lens system having a designed photographic angle of view (effective angle of view) (e.g., about 20°, other exemplary embodiments can have various values of the effective angles of view) and a designed F number (e.g., about 2.8, other exemplary embodiments can have various F number values depending upon the desired design) and can be used for an image pickup apparatus (e.g., a video camera, a digital camera, a film camera, other image capturing or viewing systems as known by one of ordinary skill in the relevant arts, and equivalents).

In the cross-sectional views of the lens system, the left side is the object side (front) and the right side is the image side (rear).

A photographic lens system in accordance with one of the third to sixth exemplary embodiments can include four lens units L1 to L4, and a photographic lens system in accordance with the seventh exemplary embodiment can include three lens units L1 to L3. As illustrated in the cross-sectional views in FIGS. 13, 16, 19, 22, and 25, a first lens unit L1 can have a positive refractive power (i.e., optical power, which is equal to an inverse of the focal length). The first lens unit L1 can include a first lens subunit L1a having a positive refractive power and a second lens subunit L1b having a negative refractive power. A second lens unit L2 can have a negative refractive power, a third lens unit L3 can have a positive refractive power, and a fourth lens unit L4 can have a negative refractive power.

An aperture stop SP can be interposed between the second lens unit L2 and the third lens unit L3. An image plane IP can be the surface of various imaging devices (e.g., a solid-state image pickup device (photoelectric transducer), a CCD or a CMOS sensor, a photo-sensitized material (e.g., such as film), other imaging surfaces as known by one of ordinary skill in the relevant art, and equivalents).

The lens structure of the inner focus macro-lens system (photographic lens system) in accordance with the third to seventh exemplary embodiments will be described below.

When a photographic lens system according to one of the third to sixth exemplary embodiments is focused on an infinite or distant object to a close-up object, the first lens unit L1 doesn't move for focusing, the second lens unit L2 moves to the image side (e.g., XB, XC, XD, XE), and the third lens unit L3 moves to the object side (e.g., YB, YC, YD, YE). By moving the second lens unit L2 and the third lens unit L3 in opposite directions (e.g., XB and YB), the overall length of the lens system can be maintained at a substantially constant length while imaging (e.g., photographing) an object at an infinite or distant object to a close-up position with a life-size magnification.

When a photographic lens system in accordance with the seventh exemplary embodiment is focused on an infinite or distant object to a close-up object, the first lens unit L1, the second lens unit L2, and the third lens unit L3 can move to the object side independently (e.g., VF, XF, and YF) In this way, imaging of an object at an infinite or distant position to a close-up position, with a life-size magnification, is facilitated.

The first lens unit L1 in accordance with one of the third to seventh exemplary embodiments can include a second lens subunit L1b having a negative refractive power that is movable in a direction, which includes a vector component orthogonal to an optical axis. Blurring of the image due to fluctuation of the photographic lens system (image pickup apparatus) can be reduced by moving the second lens subunit L1b in a direction, which includes a vector component orthogonal to the optical axis, so as to change the image location of the overall photographic lens system in respect to the optical axis and a plane orthogonal to the optical axis.

In this way, the photographic lens system, in accordance with one of the third to seventh exemplary embodiments, can displace the formed image by moving a portion of the photographic lens system in a direction, which includes a vector component orthogonal to the optical axis.

In at least one exemplary embodiment (e.g. the exemplary embodiments illustrated in FIGS. 13, 16, 19, 22, and 25), the photographic lens system can satisfy certain design values. For example, in at least one exemplary embodiment, the photographic lens system can have a design value:

$$-2.1 < fn/f < -1 \quad (2)$$

where fn represents the focal length of the second lens subunit L1b and f represents the focal length of the entire lens system.

Formula (2) presented above represents one of many possible conditions for achieving improved vibration control sensitivity+ for the second lens subunit L1b, which can have a negative refractive power and can be movable, in a direction that has at least a projection orthogonal to the optical axis, to reduce vibration, so as to achieve an improved image stabilizing function through a image stabilizing function mounted on the image pickup apparatus.

When fn/f falls below the lower limit of Formula (2) (although other exemplary embodiments can have various lower limits depending upon the desired design), it can become relatively (compared to systems having fn/f above the lower limit) more difficult to provide similar vibration control sensitivity to the second lens subunit L1b. As a result, it can become relatively more difficult to achieve the same improved image stabilizing function. When fn/f exceeds the upper limit, the refractive power of the second lens subunit L1b can become relatively larger (compared to systems having fn/f below the upper limit), and it can become more difficult to maintain the same level of reduction of the fluctuations of the aberrations, astigmatism, and distortion that occur when focusing from an infinite or distant object to a close-up object.

In yet at another exemplary embodiment, the range in Formula (2) can be set as below:

$$-1.98 < fn/f < -1.5 \quad (2a)$$

The second lens subunit L1b, which is the image stabilizing lens unit, can include a positive lens and a negative lens so as to reduce fluctuation of the aberrations when the lenses are decentered.

By forming aspherical surfaces on the lens surface closest to the object and/or the surface closest to the image in the overall photographic lens system, it can become easier to reduce spherical aberration and the off-axis aberrations (coma and astigmatism).

According to the exemplary embodiments, as described above, by specifying each element in the photographic lens, the image formed by the photographic lens can be displaced so as to reduce the optical blurring of the image when the photographic lens is vibrated (or when the image pickup apparatus is tilted). In this way, a still image can be obtained and the photographed image can have improved stabilization.

Details of the structure of lens units in accordance with the third to seventh exemplary embodiments will be described below.

A first lens subunit L1a in accordance with one of the third to seventh exemplary embodiments can include, in order from the object side to the image side, a negative lens having a concave surface on the image side, a biconvex positive lens, and a combination lens of a negative lens and a positive lens.

A second lens subunit L1b, in accordance with one of the third to seventh exemplary embodiments, can include a combination lens of a biconcave negative lens and a positive lens.

A second lens unit L2, in accordance with one of the third to seventh exemplary embodiments, can include, in order from the object side to the image side, one or two negative lenses including a negative lens having a concave surface on the image side and a combination lens of a biconcave negative lens and a positive lens.

A third lens unit L3, in accordance with one of the third to sixth exemplary embodiments, can include, from the object side to the image side, a biconvex positive lens and a cemented lens of a positive lens and a negative lens.

A third lens unit L3, in accordance with the seventh exemplary embodiment, can include a biconvex positive lens, a combination lens of a positive lens and a negative lens, a negative lens having a concave surface on the image side, a positive lens having a convex surface on the object side, and a positive meniscus lens having a concave surface on the image side.

A fourth lens unit L4, in accordance with the one of the third to sixth exemplary embodiments, can include a negative lens having a concave surface on the image side, a positive lens having a convex surface on the object side, and a positive meniscus lens having a concave surface on the image side.

The size of the overall lens system can be reduced by operatively connecting the lens units as described above. At the same time, when an inner focus system is employed, fluctuation of various aberrations, astigmatism, and distortion can be reduced when focusing from an infinite or distant object to a close-up object at a life-size magnification. Accordingly, the lens system can be used as a macro-lens system capable of reducing aberrations astigmatism, and distortion in both a normal mode and an image stabilizing mode.

The numerical data corresponding to the third to seventh exemplary embodiments are shown as third to seventh numerical examples below.

In the numerical examples shown below, the characters represent the same elements as those in the first and second exemplary embodiments.

Third Numeral Example

| $f = 61.313\ F_{no} = 2.92\ \omega = 19.4°$ | | | |
|---|---|---|---|
| r | d | n | ν |

| | r | d | n | ν |
|---|---|---|---|---|
| 1* | 735.96877 | 1.47211 | 1.658441 | 50.88 |
| 2 | 28.40664 | 6.3827 | | |
| 3 | 94.66769 | 3.4259 | 1.834807 | 42.72 |
| 4 | −88.24351 | 0.46427 | | |
| 5 | 49.01368 | 1.67385 | 1.84666 | 23.93 |
| 6 | 24.30834 | 6.06706 | 1.729157 | 54.68 |
| 7 | −81.41682 | 1.0025 | | |
| 8 | −164.0071 | 1.47042 | 1.720467 | 34.7 |
| 9 | 27.7971 | 2.63201 | 1.84666 | 23.93 |
| 10 | 92.28085 | variable | | |
| 11 | 249.98168 | 1.39642 | 1.834807 | 42.72 |
| 12 | 32.24868 | 4.08317 | | |
| 13 | −27.9825 | 1.82713 | 1.658441 | 50.88 |
| 14 | 34.86283 | 6.99295 | 1.834807 | 42.72 |
| 15 | −30.30064 | variable | | |
| 16 | aperture stop | variable | | |
| 17 | 78.44721 | 4.12673 | 1.603112 | 60.64 |
| 18 | −55.72639 | 0.12484 | | |
| 19 | 93.21919 | 5.11674 | 1.638539 | 55.38 |
| 20 | −36.068 | 1.11445 | 1.84666 | 23.93 |
| 21 | −502.4909 | variable | | |
| 22 | 673.94904 | 1.10593 | 1.743198 | 49.34 |
| 23 | 21.72611 | 3.01311 | 1.755199 | 27.51 |
| 24 | 30.09173 | 3.42115 | | |
| 25 | 33.91093 | 3.98238 | 1.517417 | 52.43 |
| 26* | 109.64186 | 46.1294 | | |

| | ∞ | −0.5 x | −1.0 x |
|---|---|---|---|
| d10 | 1.3776 | 6.0465 | 12.2943 |
| d15 | 11.6675 | 7.1986 | 0.9509 |
| d16 | 23.3257 | 7.9148 | 0.9631 |
| d21 | 1.7375 | 9.5310 | 24.1005 |

| r1 Aspherical | | r26 Aspherical | |
|---|---|---|---|
| C4 | −1.92013E−06 | C4 | 6.13188E−06 |
| C6 | 5.51709E−09 | C6 | −3.04458E−09 |

| $f = 61.313\ F_{no} = 2.92\ \omega = 19.4°$ | | | |
|---|---|---|---|
| C8 | −1.51076E−11 | C8 | 4.74256E−12 |
| C10 | 2.53078E−14 | | |
| C12 | −4.78212E−18 | | |

Fourth Numeral Example

| $f = 65.032\ F_{no} = 2.93\ \omega = 18.4$ | | | |
|---|---|---|---|
| r | d | n | ν |

| | r | d | n | ν |
|---|---|---|---|---|
| 1 | 95.92828 | 1.448 | 1.658441 | 50.88 |
| 2 | 29.04973 | 6.39608 | | |
| 3 | 158.6984 | 3.38717 | 1.834807 | 42.72 |
| 4 | −110.496 | 0.39938 | | |
| 5 | 41.06505 | 0.74615 | 1.84666 | 23.93 |
| 6 | 23.93291 | 6.30882 | 1.729157 | 54.68 |
| 7 | −105.44 | 1.0025 | | |
| 8 | −162.689 | 0.74643 | 1.720467 | 34.7 |
| 9 | 29.18622 | 2.27565 | 1.84666 | 23.93 |
| 10 | 89.8985 | variable | | |
| 11 | −467.99 | 1 | 1.846657 | 23.89 |
| 12 | −2296.77 | 1.19787 | | |
| 13 | −467.437 | 1.27591 | 1.785896 | 44.2 |
| 14 | 35.89623 | 3.59294 | | |
| 15 | −29.8814 | 1.10898 | 1.647689 | 33.79 |
| 16 | 35.55189 | 5.85598 | 1.850259 | 32.29 |
| 17 | −32.0667 | variable | | |
| 18 | aperture stop | variable | | |
| 19 | 91.40787 | 4.17404 | 1.651597 | 58.55 |
| 20 | −57.3316 | 0.0684 | | |
| 21 | 72.75638 | 5.63614 | 1.638539 | 55.38 |
| 22 | −38.5522 | 1.65564 | 1.84666 | 23.93 |
| 23 | −1261.48 | variable | | |
| 24 | −1024.21 | 1.0823 | 1.729157 | 54.68 |
| 25 | 23.08474 | 2.97613 | 1.755199 | 27.51 |
| 26 | 29.26141 | 2.44215 | | |
| 27 | 31.51304 | 4.30005 | 1.583126 | 59.4 |
| 28 | 91.08727 | 46.1867 | | |

| | ∞ | −0.5 x | −1.0 x |
|---|---|---|---|
| d10 | 1.197872 | 6.774763 | 15.0952 |
| d17 | 14.84685 | 9.270071 | 0.949732 |
| d18 | 25.01997 | 9.759717 | 0.949725 |
| d23 | 1.619254 | 10.67306 | 25.70105 |

Fifth Numeral Example

| $f = 55.00\ F_{no} = 2.93\ \omega = 21.47°$ | | | |
|---|---|---|---|
| r | d | n | ν |

| | r | d | n | ν |
|---|---|---|---|---|
| 1 | 128.1866 | 1.47319 | 1.658441 | 50.88 |
| 2 | 24.77485 | 6.65345 | 1 | |
| 3 | 348.2007 | 2.34308 | 1.834807 | 42.72 |
| 4 | −95.2229 | 0.4465 | 1 | |
| 5 | 38.63825 | 1.27855 | 1.84666 | 23.93 |
| 6 | 22.34792 | 5.97281 | 1.729157 | 54.68 |
| 7 | −95.3974 | 1.0025 | 1 | |
| 8 | −130.975 | 1.45426 | 1.720467 | 34.7 |
| 9 | 28.79741 | 2.43309 | 1.84666 | 23.93 |
| 10 | 108.6767 | variable | 1 | |
| 11 | −1200.8 | 1.37884 | 1.834807 | 42.72 |
| 12 | 36.37145 | 3.29591 | 1 | |
| 13 | −28.7617 | 1.01033 | 1.647689 | 33.79 |
| 14 | 35.07382 | 5.73698 | 1.850259 | 32.29 |

-continued $f = 55.00$ $F_{no} = 2.93$ $\omega = 21.47°$

| | | | | |
|---|---|---|---|---|
| 15 | −29.7375 | variable | 1 | |
| 16 | aperture stop | variable | 1 | |
| 17 | 74.89871 | 4.5119 | 1.651597 | 58.55 |
| 18 | −53.867 | 0.12462 | 1 | |
| 19 | 73.57989 | 6.08753 | 1.638539 | 55.38 |
| 20 | −33.9108 | 1.28746 | 1.84666 | 23.93 |
| 21 | 1485.466 | variable | 1 | |
| 22 | 1421.072 | 1.12127 | 1.743198 | 49.34 |
| 23 | 20.26572 | 3.90482 | 1.755199 | 27.51 |
| 24 | 29.37986 | 1.91229 | 1 | |
| 25 | 32.54097 | 4.27085 | 1.517417 | 52.43 |
| 26* | 134.5403 | 44.96579 | 1 | |

| | ∞ | −0.5 x | −1.0 x |
|---|---|---|---|
| d10 | 1.267861 | 6.924556 | 14.27442 |
| d15 | 13.956866 | 8.300259 | 0.950342 |
| d16 | 23.232831 | 8.116729 | 0.950048 |
| d21 | 1.666701 | 8.806753 | 23.94578 | r26 Aspherical

| | |
|---|---|
| C4 | 6.13E−07 |
| C6 | −3.04E−09 |

Sixth Numeral Example $f = 63.02$ $F_{no} = 2.93$ $\omega = 18.94°$

| | r | d | n | ν |
|---|---|---|---|---|
| 1 | 138.4311 | 1.46464 | 1.570989 | 50.8 |
| 2 | 27.63282 | 6.23354 | | |
| 3 | 168.4969 | 3.03059 | 1.806098 | 40.92 |
| 4 | −94.821 | 0.4424 | | |
| 5 | 41.3299 | 1.26463 | 1.805181 | 25.42 |
| 6 | 21.64563 | 6.71957 | 1.712995 | 53.87 |
| 7 | −116.855 | 1.0025 | | |
| 8 | −153.419 | 1.42958 | 1.720467 | 34.7 |
| 9 | 28.28099 | 2.5505 | 1.84666 | 23.93 |
| 10 | 91.4279 | variable | | |
| 11 | −826.523 | 1.38077 | 1.785896 | 44.2 |
| 12 | 36.8593 | 3.55546 | | |
| 13 | −28.3488 | 0.98693 | 1.654115 | 39.7 |
| 14 | 34.75559 | 5.99045 | 1.834 | 37.16 |
| 15 | −30.3542 | variable | | |
| 16 | aperture stop | variable | | |
| 17 | 104.4651 | 4.25817 | 1.622992 | 58.16 |
| 18 | −52.9619 | 0.11646 | | |
| 19 | 79.28261 | 5.84577 | 1.622992 | 58.16 |
| 20 | −36.3266 | 1.19586 | 1.84666 | 23.93 |
| 21 | −277.531 | variable | | |
| 22 | −519.048 | 4.91828 | 1.712995 | 53.87 |
| 23 | 29.84978 | 1.74072 | | |
| 24 | 31.45902 | 4.17575 | 1.6727 | 32.1 |
| 25 | 74.28057 | 45.54785 | | |

| | ∞ | −0.5 x | −1.0 x |
|---|---|---|---|
| d10 | 1.4490 | 6.8446 | 15.0378 |
| d15 | 14.5495 | 9.1538 | 0.9606 |
| d16 | 25.1626 | 10.1537 | 0.9499 |
| d21 | 1.5375 | 10.8540 | 25.7474 |

Seventh Numeral Example $f = 58.91$ $F_{no} = 2.93$ $\omega = 26.17°$

| | r | d | n | ν |
|---|---|---|---|---|
| 1 | 84.30514 | 6.58797 | 1.658441 | 50.88 |
| 2 | 25.81231 | 7.49236 | 1 | |
| 3 | 1318.446 | 3.68108 | 1.834807 | 42.72 |
| 4 | −102.958 | 2.57627 | 1 | |
| 5 | 35.59207 | 1.2834 | 1.84666 | 23.93 |
| 6 | 21.26344 | 5.80197 | 1.723317 | 53.95 |
| 7 | −85.9362 | 1.0025 | 1 | |
| 8 | −200 | 1.53973 | 1.720467 | 34.7 |
| 9 | 26.15307 | 2.70083 | 1.84666 | 23.93 |
| 10 | 84.11249 | variable | 1 | |
| 11 | −414.125 | 2.65377 | 1.785896 | 44.2 |
| 12 | 39.20616 | 3.87501 | 1 | |
| 13 | −30.0294 | 2.59267 | 1.647689 | 33.79 |
| 14 | 49.72644 | 5.16014 | 1.850259 | 32.29 |
| 15 | −32.5839 | variable | 1 | |
| 16 | aperture stop | variable | 1 | |
| 17 | 139.4334 | 3.53184 | 1.696797 | 55.53 |
| 18 | −66.0251 | 0.13955 | 1 | |
| 19 | 72.18518 | 5.10928 | 1.651597 | 58.55 |
| 20 | −40.0891 | 2.02879 | 1.84666 | 23.93 |
| 21 | −1261.2 | 1.00696 | 1 | |
| 22 | 378.0528 | 1.84349 | 1.712995 | 53.87 |
| 23 | 26.29234 | 2.3116 | 1.755199 | 27.51 |
| 24 | 30.38867 | 1.55281 | 1 | |
| 25 | 31.38257 | 3.75163 | 1.570989 | 50.8 |
| 26 | 77.79138 | 60.02375 | 1 | |

| | ∞ | −0.5 x | −1.0 x |
|---|---|---|---|
| d10 | 1.515238 | 4.942949 | 8.385289 |
| d15 | 5.550490 | 10.732593 | 0.968238 |
| d16 | 22.032311 | 3.954025 | 0.999798 |

TABLE 1

| Exemplary Embodiment | Formula 2 |
|---|---|
| Third Exemplary Embodiment | −1.80 |
| Fourth Exemplary Embodiment | −1.61 |
| Fifth Exemplary Embodiment | −2.03 |
| Sixth Exemplary Embodiment | −1.67 |
| Seventh Exemplary Embodiment | −1.91 |

A single lens reflex camera system including a photographic lens system according to the exemplary embodiments will be described with reference to FIG. 28.

Figure 28:
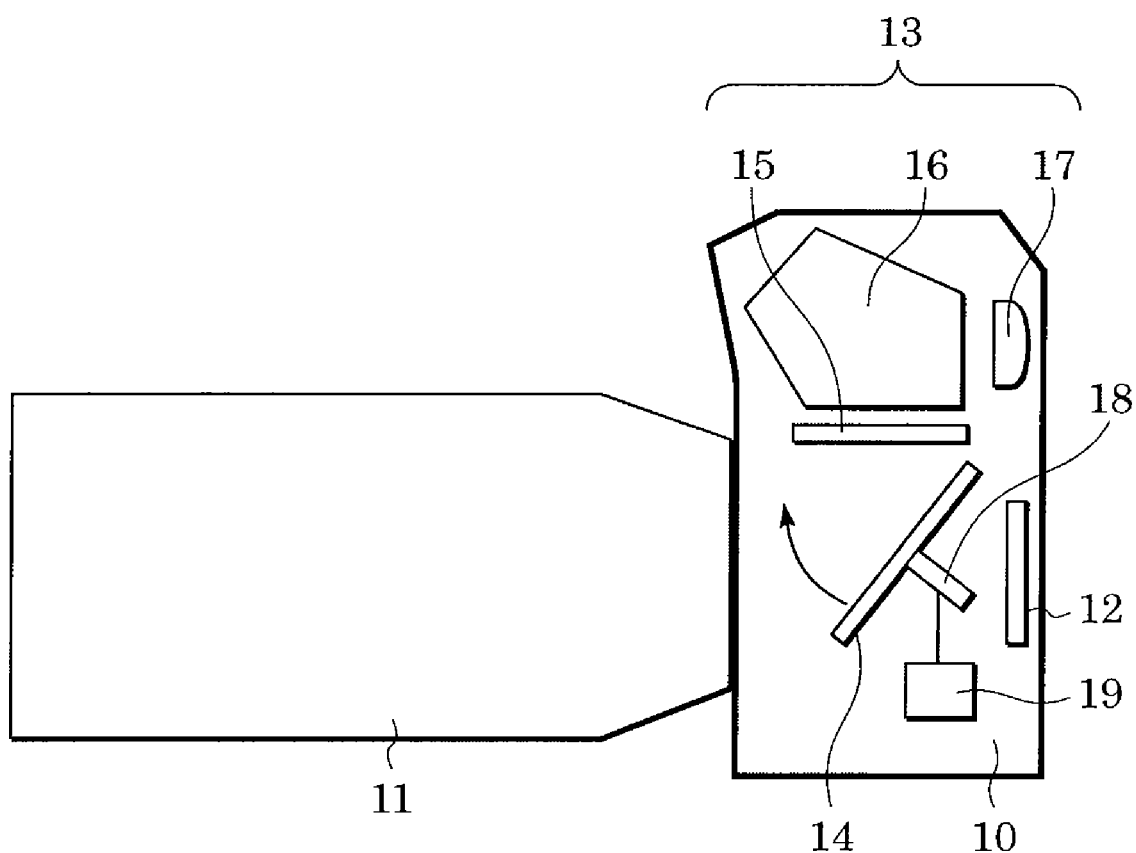
FIG. 28 illustrates a schematic view of main components of an image pickup apparatus.

FIG. 28 illustrates a single lens reflex camera body 10, an interchangeable lens unit 11 including the photographic lens system according to at least one exemplary embodiment, an image pickup surface 12 (e.g., film, a photoelectric transducer) configured to record an image of an object obtained through the interchangeable lens unit 11, a viewfinder optical system 13 configured to observe the image of an object obtained through the interchangeable lens unit 11, a quick-return mirror 14 configured to rotate so as to switch between the image pickup surface 12 and the viewfinder optical system 13 for sending the image of the object from the interchangeable lens unit 11. When observing an image of the object through the viewfinder, the image formed on a focusing plate 15 via the quick-return mirror 14 is rotated to an upright position by a pentaprism 16. Then the upright image is enlarged by an eyepiece optical system 17 for observation. While photographing, the quick-return mirror 14 is rotated in the direction indicated by the arrow and an image of an object is formed on the image pickup surface 12. FIG. 28 also illustrates a sub-mirror 18 and a focus detection device 19.

By employing a photographic lens system in accordance with an exemplary embodiment, an image pickup apparatus having improved optical performance can be facilitated.

The photographic lens system in accordance with exemplary embodiments can also be employed in a single lens reflex camera without a quick-return mirror 14. Additional exemplary embodiments are not limited by the contents of the devices to which they may be operatively connected.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A photographic lens system comprising:
   a first lens unit including a first lens subunit having a positive refractive power and a second lens subunit having a negative refractive power, wherein the second lens subunit is movable in a first direction which includes a vector component orthogonal to an optical axis; and
   a plurality of lens units movable during focusing, wherein the plurality of lens units is disposed on an image side of the first lens unit,
   wherein an image formed by the photographic lens system is displaced in response to the second lens subunit moving in the first direction which includes the vector component orthogonal to the optical axis, and
   wherein the photographic lens system is a fixed focal length lens system.

2. The photographic lens system according to claim 1, wherein the second lens subunit includes a positive lens and a negative lens.

3. The photographic lens system according to claim 1, wherein the photographic lens system forms the image on a photoelectric transducer.

4. An image pickup apparatus comprising:
   the photographic lens system according to claim 1; and
   a photoelectric transducer configured to receive light of the image formed by the photographic lens system.

5. The photographic lens system according to claim 1, wherein a distance between adjacent lens units varies during focusing.

* * * * *